US009858144B2

(12) United States Patent
DeBenedictis

(10) Patent No.: US 9,858,144 B2
(45) Date of Patent: Jan. 2, 2018

(54) PROCESSOR-IN-MEMORY-AND-STORAGE ARCHITECTURE

(71) Applicant: National Technology & Engineering Solutions of Sandia, LLC, Albuquerque, NM (US)

(72) Inventor: Erik DeBenedictis, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 218 days.

(21) Appl. No.: 14/831,711

(22) Filed: Aug. 20, 2015

(65) Prior Publication Data
US 2017/0052846 A1 Feb. 23, 2017

(51) Int. Cl.
*G11C 29/00* (2006.01)
*G06F 11/10* (2006.01)

(52) U.S. Cl.
CPC .................. *G06F 11/1068* (2013.01)

(58) Field of Classification Search
CPC ................................................. G06F 11/1068
See application file for complete search history.

(56) References Cited

U.S. PATENT DOCUMENTS

| 5,526,318 A * | 6/1996 | Slemmer ................ | G11C 8/18 365/226 |
| 8,667,044 B1 * | 3/2014 | Old ........................ | G06F 7/535 708/654 |
| 2016/0054782 A1 * | 2/2016 | Kaburlasos ........... | G06F 1/3234 713/320 |

OTHER PUBLICATIONS

Brown et al., "Improvement of Electronic-Computer Reliability through the Use of Redundancy," IRE Transactions on Electronic Computers, Sep. 1961, pp. 407-416.
Teoste, "Design of a Repairable Redundant Computer," IRE Transactions on Electronic Computer, Oct. 1962, pp. 643-649.
Bhardwaj et al., "Low Power Signal Processing Architectures Using Residue Arithmetic," IEEE International Conference on Acoustics, Speech and Signal Processing, vol. 5, May 1998, pp. 3017-3020.
Watson et al., "Self-Checked Computation Using Residue Arithmetic," Proceedings of the IEEE, vol. 54, No. 12, Dec. 1966, pp. 1920-1931.
Theis et al., "In Quest of the 'Next Switch': Prospects for Greatly Reduced Power Dissipation in a Successor to the Silicon Field-Effect Transistor," Proceedings of the IEEE, vol. 98, No. 12, Dec. 2010, pp. 2005-2014.

(Continued)

*Primary Examiner* — Sam Rizk
(74) *Attorney, Agent, or Firm* — Yee & Associates, P.C.

(57) ABSTRACT

A method and apparatus for performing reliable general-purpose computing. Each sub-core of a plurality of sub-cores of a processor core processes a same instruction at a same time. A code analyzer receives a plurality of residues that represents a code word corresponding to the same instruction and an indication of whether the code word is a memory address code or a data code from the plurality of sub-cores. The code analyzer determines whether the plurality of residues are consistent or inconsistent. The code analyzer and the plurality of sub-cores perform a set of operations based on whether the code word is a memory address code or a data code and a determination of whether the plurality of residues are consistent or inconsistent.

24 Claims, 14 Drawing Sheets

(56) References Cited

OTHER PUBLICATIONS

Karakiewicz et al., "1.1 TMACS/mW Fine-Grained Stochastic Resonant Charge-Recycling Array Processor," IEEE Sensors Journal, vol. 12, No. 4, Apr. 2012, pp. 785-792.
Chen et al., "Energy-Efficient Digital Signal Processing via Voltage-Overscaling-Based Residue Number System," IEEE Transaction on Very Large Scale Integration (VLSI) Systems, vol. 21, No. 7, Jul. 2013, pp. 1322-1332.
Urata et al., "A Low-Power Sense Amplifier for Adiabatic Memory Using Memristor, " IEEE Asia Pacific Conference on Circuits and Systems (APCCAS), Dec. 2012, pp. 112-115.
Palem et al., "Sustaining Moore's Law in Embedded Computing through Probabilistic and Approximate Design: Retrospects and Prospects," Conference on Compliers, Architecture, and Synthesis for Embedded System (CASES), Oct. 2009, pp. 1-10.
Hall et al., "Mapping Irregular Application to DIVA, a PIM-based Data-Intensive Architecture," ACM/IEEE Conference on Suptercomputing, Nov. 1999, 18 pages.
Avery et al., "A Three-Port Adiabatic Register File Suitable for Embedded Applications," ACM International Symposium on Low Power Electronics and Design, copyright 1998, 5 pages.

\* cited by examiner

| INSTR. CODE | Yout | Lout | Rout | WZout |
|---|---|---|---|---|
| IN | | init | init | |
| C | a*Rin | | Rin | Lin |
| D | | | | a*Lin |
| E | | Yin + a*Lin | WZin | WZin |
| F | a*Lin | | | WZin |
| G | | a*Yin | | |
| H | Yin + a*Lin | WZin | | |

PROCESSOR-IN-MEMORY-AND-STORAGE ARCHITECTURE

GOVERNMENT LICENSE RIGHTS

This invention was made with United States Government support under Contract No. DE-AC04-94AL85000 between Sandia Corporation and the United States Department of Energy. The United States Government has certain rights in this invention.

CROSS-REFERENCE TO RELATED APPLICATION

This application is related to the following U.S. patent application entitled: "METHOD AND APPARATUS FOR MANAGING ACCESS TO A MEMORY," U.S. Ser. No. 14/831,702, filed even date hereof, and incorporated herein by reference in its entirety.

BACKGROUND INFORMATION

1. Field

The present disclosure relates generally to a computing system. More particularly, the present disclosure relates to method and apparatus for improving the energy efficiency of a computing system by mitigating data errors and memory address errors and by recycling energy.

2. Background

Reliability and energy efficiency have been and continue to be important issues in computing. However, as computing systems become more and more complex and the number of hardware components in these computing systems increases, improving the energy efficiency of these computing systems while ensuring reliability may become more difficult than desired.

Currently, the increase in the number of components per square inch of an integrated circuit over time may be approximated by Moore's Law. Moore's law is an observation that the number of transistors per square inch of integrated circuits has approximately doubled every few years. Moore's law projects that this trend will continue for the next few decades.

Based on Moore's law, the power or energy dissipated per transistor should decrease by approximately half every few years to avoid overheating. However, reducing the power or energy in the signals used by computing systems may eventually create reliability concerns. For example, reducing transistor power may eventually result in signals that are too weak to reliably define the intended values of binary digits. Consequently, the data generated by and processed by computing systems using lower-powered transistors may be more error-prone.

Higher-powered transistors may be used in accordance with adiabatic principles to reduce these types of errors without overheating. Using the energy in higher-powered transistors multiple times before dissipating the energy to the environment creates the same overall effect as using lower-powered transistors. If the number of times energy is recycled can approximately double every few years, the doubling of the number of components predicted by Moore's Law could continue. Therefore, it would be desirable to have a method and apparatus that take into account at least some of the issues discussed above, as well as other possible issues.

SUMMARY

In one illustrative embodiment, an apparatus comprises a memory, a processor core in communication with the memory, and a code analyzer. The processor core comprises a plurality of sub-cores in which a numeric range of each of the plurality of sub-cores is less than a total numeric range of the processor core. The code analyzer is in communication with the memory and the plurality of sub-cores of the processor core. The code analyzer performs error mitigation using code words received from the plurality of sub-cores.

In another illustrative embodiment, a computing system comprises a processor, a memory in communication with the processor, and a code analysis system in communication with the processor and the memory. The processor is comprised of a set of processor cores. A processor core in the set of processor cores comprises a plurality of sub-cores in which a numeric range of each of the plurality of sub-cores is less than a total numeric range of the processor core. The code analysis system is in communication with the processor and the memory. The code analysis system comprises a set of code analyzers in communication with the set of processor cores. Each code analyzer performs data error detection for data processed by a corresponding processor core of the set of processor cores and performs memory address validation for the corresponding processor core.

In yet another illustrative embodiment, an apparatus comprises a memory array, a switch, and an energy storage unit. The memory array comprises a plurality of rows and a plurality of columns. The switch electrically connects to a particular row of the plurality of rows of the memory array per cycle. The energy storage unit is electrically connected to the memory array through the switch.

In still yet another embodiment, a method is provided for performing reliable general-purpose computing. Each sub-core of a plurality of sub-cores of a processor core processes a same instruction at a same time. A code analyzer receives a plurality of residues that represents a code word corresponding to the same instruction and an indication of whether the code word is a memory address code or a data code from the plurality of sub-cores. The code analyzer determines whether the plurality of residues are consistent or inconsistent. The code analyzer and the plurality of sub-cores perform a set of operations based on whether the code word is a memory address code or a data code and a determination of whether the plurality of residues are consistent or inconsistent.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
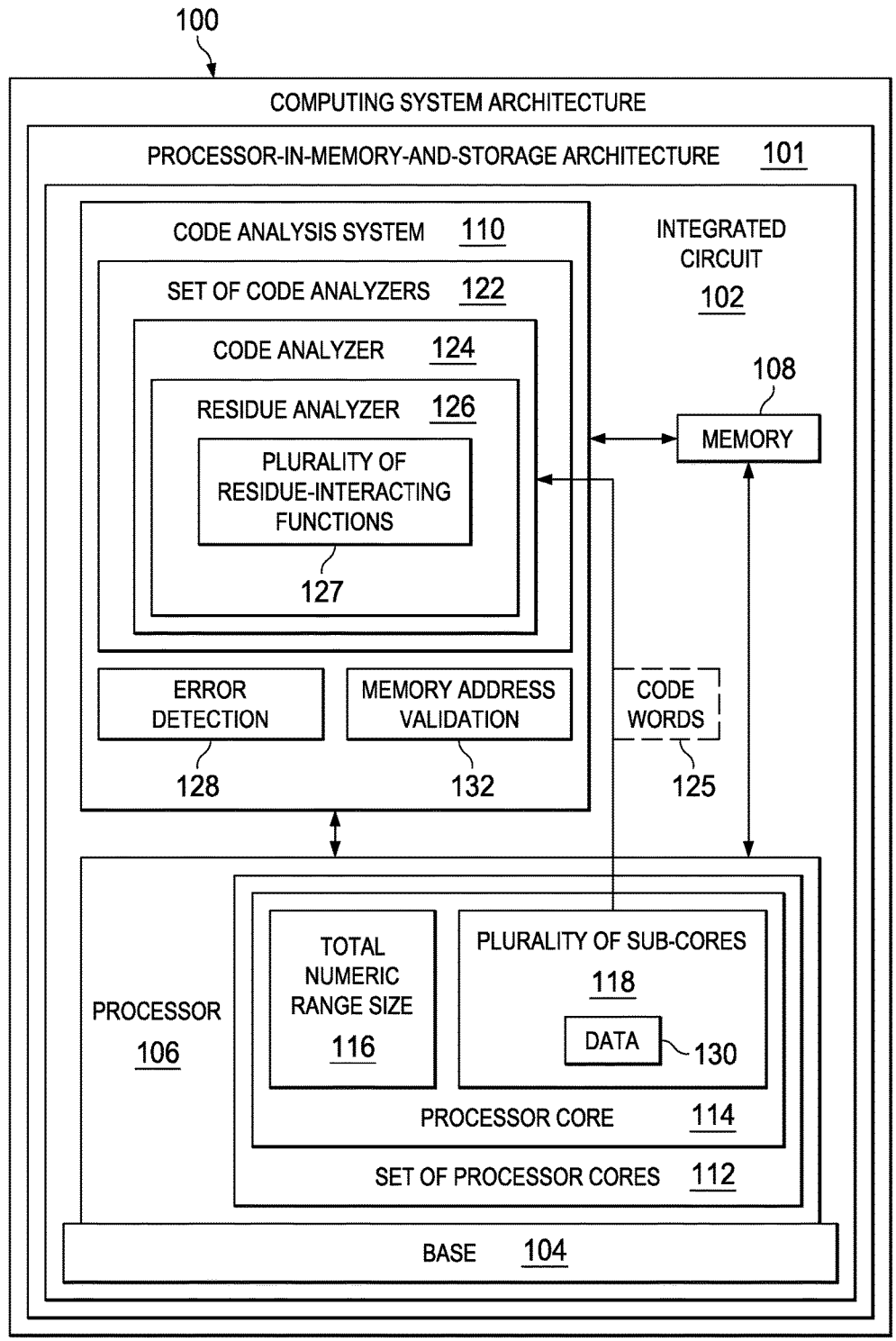
FIG. 1 is an illustration of a block diagram of a computing system in accordance with an illustrative embodiment.

The illustrative embodiments recognize and take into account different considerations. For example, the illustrative embodiments recognize and take into account that it may be desirable to have a computing system that is both energy efficient and reliable. In particular, the illustrative embodiments recognize and take into account that error mitigation and energy recycling may be used to improve the energy efficiency and reliability of a computing system.

The illustrative embodiments recognize and take into account that error mitigation may be used to improve the reliability of a computing system that may be prone to data errors and memory address errors due to lower-powered transistors. In one illustrative example, a redundant residue number system (RRNS) may be used to mitigate errors in data and errors in memory addresses.

Further, the illustrative embodiments recognize and take into account that energy recycling may be used to improve the energy efficiency of memory in computing systems. In particular, storing energy and recycling energy to form a dynamic power supply that drives the memory of a computing system in an adiabatic manner may reduce energy consumption.

In this manner, error mitigation, energy recycling, or a combination of both may be used to create a computing system that is both energy-efficient and reliable. Thus, the illustrative embodiments provide a method and apparatus for performing reliable, general-purpose computing in an energy-efficient manner.

In one illustrative example, a computing system comprises a processor, a memory in communication with the processor, and a code analysis system in communication with the processor and the memory. The processor is comprised of a set of processor cores. A processor core in the set of processor cores comprises a plurality of sub-cores in which a numeric range of each of the plurality of sub-cores is less than a total numeric range of the processor core. The code analysis system is in communication with the processor and the memory. The code analysis system comprises a set of code analyzers in communication with the set of processor cores. Each code analyzer performs data error detection for data processed by a corresponding processor core of the set of processor cores and performs memory address validation for the corresponding processor core.

In some illustrative examples, a memory, such as the memory described above, may take the form of an adiabatic memory circuit. For example, the memory may comprise a memory array, a switch, and an energy storage unit. The memory array comprises a plurality of rows and a plurality of columns. The switch electrically connects to a particular row of the plurality of rows of the memory array per cycle. The energy storage unit is electrically connected to the memory array through the switch. The memory array, the switch, and the energy storage unit form an adiabatic memory circuit that reduces heat loss through energy recycling.

In still yet another example, a method is provided for performing reliable general-purpose computing. Each sub-core of a plurality of sub-cores of a processor core processes a same instruction at a same time. A code analyzer receives a plurality of residues that represent a code word corresponding to the instruction and an indication of whether the code word is a memory address code or a data code from the plurality of sub-cores. The code analyzer determines whether the plurality of residues are consistent or inconsistent. The code analyzer and the plurality of sub-cores perform a set of operations based on whether the code word is a memory address code or a data code and based on a determination of whether the plurality of residues are consistent or inconsistent.

Referring now to the figures and, in particular, with reference to FIG. 1, an illustration of a block diagram of a computing system is depicted in accordance with an illustrative embodiment. In this illustrative example, computing system 100 may be used to form general-purpose computing. In some illustrative examples, computing system 100 may be referred to as a computing system architecture.

In one illustrative example, computing system 100 takes the form of processor-in-memory-and-storage architecture 101. Processor-in-memory-and-storage architecture 101 may be implemented in the form of integrated circuit 102. As depicted, processor-in-memory-and-storage architecture 101 includes base 104, processor 106, memory 108, and code analysis system 110.

Base 104 may be a substrate comprised of one or more layers depending on the implementation. In one illustrative example, base 104 may comprise a single layer of semiconductor material, such as, but not limited to, silicon. In another illustrative example, base 104 may include an insulator layer and a semiconductor layer. The insulator layer may be comprised of, for example, without limitation, silicon oxide, aluminum oxide, fiberglass, or some combination thereof. The semiconductor layer may be comprised of one or more semiconductor materials on top of the insulator layer. The semiconductor layer may be a thin, continuous layer over the insulator layer or a thin, discontinuous layer over the insulator layer. In some illustrative examples, base 104 may take the form of a circuit board.

Processor 106 may be fabricated on base 104. Processor 106 may include set of processor cores 112. As used herein, a "set of" items may include one or more items. In this manner, set of processor cores 112 may include one or more processor cores. For example, set of processor cores 112 may include a single processor core or a plurality of processor cores. Each processor core of set of processor cores 112 may include multiple sub-cores.

Processor core 114 may be an example of one of set of processor cores 112. Processor core 114 may have total numeric range 116. Total numeric range 116 is the number of different numerical values that can be represented by the hardware of processor 106. Total numeric range 116 may be, for example, without limitation, 2 to the power of 32, which is equal to 4,294,967,296. In other illustrative examples, total numeric range 116 may be some other numeric range.

Processor core 114 may be formed by plurality of sub-cores 118. Each of plurality of sub-cores 118 may have a numeric range selected such that the product of all of these numeric ranges equals total numeric range 116. As used herein, when a sub-core of a processor core is referred to as having a numeric range, the numeric range is a property of the sub-core that indicates the number of different numerical values that can be represented by the sub-core. This numeric range may be based on the number of bits that a sub-core can use to express a largest numerical value. The number of bits that a sub-core or a processor core can use to express a largest numerical value may be referred to as a word size.

For example, a sub-core may have a word size of 8 bits, which may indicate that the sub-core may have a maximum numeric range of up to 2 to the power of 8, which is 256. In some cases, a particular sub-core may be configured to have a numeric range less than the maximum numeric range. For example, a particular sub-core may have a maximum numeric range of 256 but may be configured to have a numeric range of 199.

In one illustrative example, each sub-core of plurality of sub-cores 118 may have numeric ranges that are byte-representable fractions of total numeric range 116. As one illustrative example, total numeric range 116 may be slightly more than 2 to the power of 31, which is 2,149,852,322. In this example, plurality of sub-cores 118 may include 4 sub-cores. Each of these 4 sub-cores may have a numeric range that is slightly less than the expressible range of a byte. For example, the 4 sub-cores may have the numeric ranges of 199, 233, 194, and 194. In this example, these 4 sub-cores may form processor core 114 having total numeric range 116 that is a product of all of these numeric ranges. For example, total numeric range 116 may be the product of 199, 233, 194, and 194, which is 2,149,852,322.

In other illustrative examples, the numeric ranges for plurality of sub-cores 118 may take on values that are relatively prime to each other. In some cases, these relatively prime values may be chosen to be efficiently representable in convenient numbers of bits, such as 8 bits, 16 bits, or some other number of bits.

Each processor core of set of processor cores 112 of processor 106 may be implemented with a logic technology that scales signal power levels down with successive generations. In one illustrative example, each processor core of set of processor cores 112 may be implemented using lower-powered transistors that produce signals having lower signal power. This type of scaling down of signal power may eventually lead to a rise in errors that will need to be managed. In other words, as the signal power of the signals that are used to define the values of binary digits decreases, the number of errors introduced in these resulting values may increase.

Code analysis system 110 enables error mitigation in a manner that does not increase the total amount of energy consumption. In particular, code analysis system 110 uses less energy to mitigate the errors introduced by the lowering of the signal power in the signals than is saved by this lowering of signal power. In this manner, code analysis system 110 enables error mitigation for systems using signals of lower signal power without completely undoing the energy benefits provided by the lowering of the signal power.

Code analysis system 110 may include set of code analyzers 122. Set of code analyzers 122 corresponds with set of processor cores 112. In particular, each of set of code analyzers 122 corresponds with a particular one of set of processor cores 112. Each code analyzer may be used to analyze a code word received from the corresponding processor core.

Code analyzer 124 may be an example of one of set of code analyzers 122. Code analyzer 124 is used to analyze code words 125 received from processor core 114. In one illustrative example, code words 125 may be generated by processor core 114 based on a redundant residue number system (RRNS). For example, plurality of sub-cores 118 that make up processor core 114 may send residues that represent code words 125 to code analyzer 124.

In this manner, code analyzer 124 may also be referred to as residue analyzer 126. Residue analyzer 126 may include plurality of residue-interacting functions 127 that are used to analyze the residues received from plurality of sub-cores 118 that make up processor core 114. In particular, residue analyzer 126 analyzes the residues that represent code words 125 to detect errors that may need to be corrected.

Both processor 106 and code analysis system 110 are in communication with memory 108. With respect to processor 106, each processor core of set of processor cores 112 may be capable of communicating with memory 108. Memory 108 uses signals of sufficiently high power to ensure reliability. In one illustrative example, memory 108 is implemented in a manner that allows energy recycling, to thereby improve the energy efficiency of processor-in-memory-and-storage architecture 101.

In some illustrative examples, a portion of memory 108 may use non-volatile or persistent memory cells to retain data in the absence of power. Memory 108 is described in greater detail in FIG. 3 below.

Depending on the implementation, a computing system may include any number of duplicate blocks of processor-in-memory-and-storage architecture 101 on a same chip. As one illustrative example, two to tens to hundreds of layers of processor-in-memory-and-storage architecture 101 may be fabricated on a silicon chip to form an energy-efficient computing system.

Figure 2:
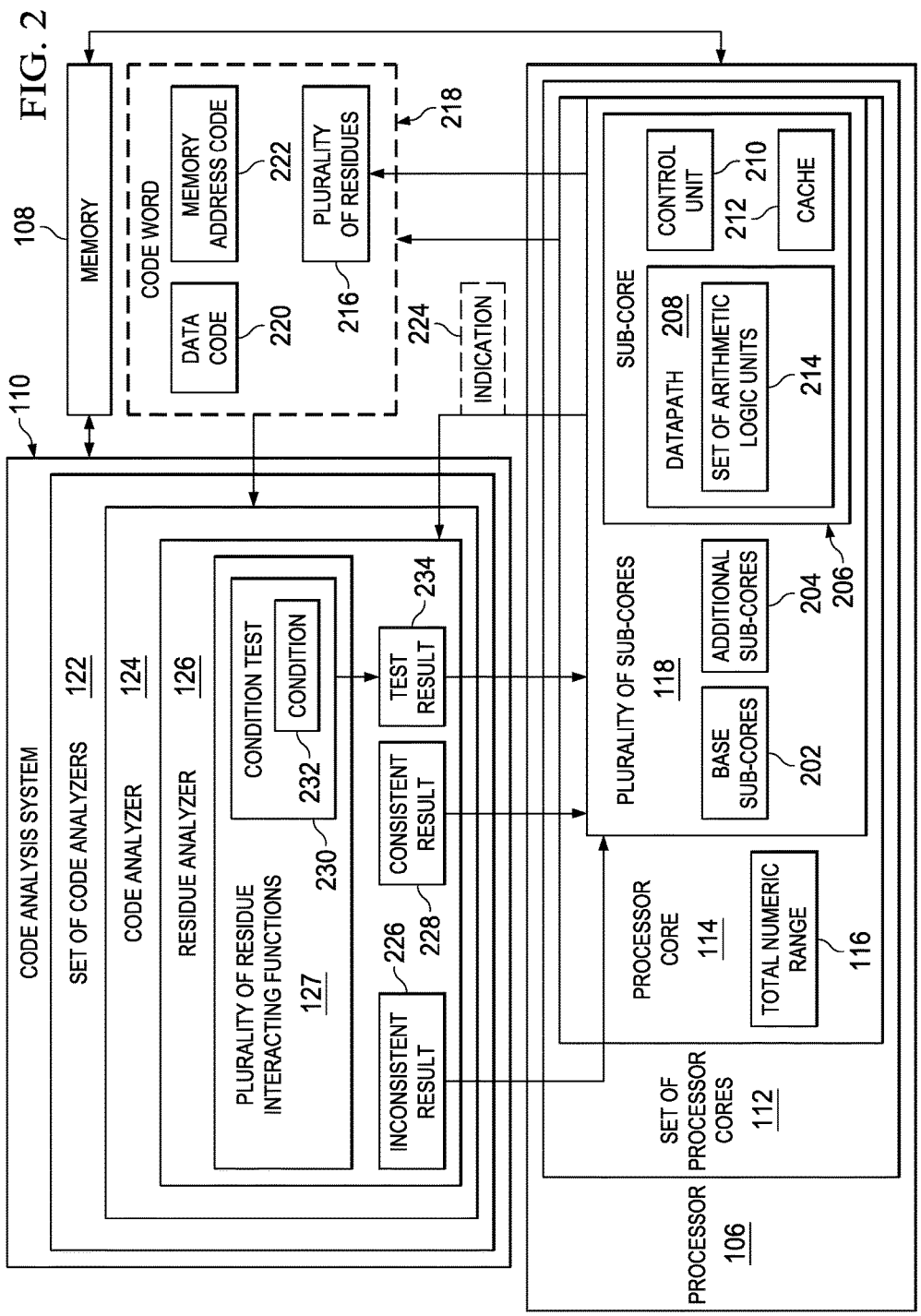
FIG. 2 is an illustration of a block diagram of a processor, a memory, and a code analysis system in accordance with an illustrative embodiment.

With reference now to FIG. 2, an illustration of a block diagram of processor 106, memory 108, and code analysis system 110 from FIG. 1 is depicted in greater detail in accordance with an illustrative embodiment. As described above, processor 106 includes set of processor cores 112. Processor core 114 of set of processor cores 112 includes plurality of sub-cores 118.

As described above, each sub-core of plurality of sub-cores 118 may process data having a numeric range that is a fraction of total numeric range 116 for the data that can be processed by processor core 114 formed by plurality of sub-cores 118. As one illustrative example, processor core 114 may be selected to have total numeric range 116 of 2,149,852,322.

Processor core 114 may be formed using base sub-cores 202 and additional sub-cores 204, which together form plurality of sub-cores 118. Additional sub-cores 204 may provide redundancy, which may be useful for performing error detection. The number of additional sub-cores 204 may determine the number of errors that can be detected and the number of errors that can be corrected.

For example, without limitation, processor core 114 having total numeric range 116 of 2,149,852,322 bits may be formed using 4 base sub-cores with the numeric ranges of 199, 233, 194, and 239 and 2 additional sub-cores with the numeric ranges of 251 and 509. All six of these numeric ranges are relatively prime with respect to each other. Each of the four base sub-cores and one of the additional sub-cores may have numeric ranges that can be fully expressed using eight bits. The other additional sub-core may have a numeric range that can be fully expressed in nine bits. The two additional sub-cores may be used for performing error detection. With two additional sub-cores, up to two errors may be detected and one error corrected.

Sub-core 206 may be an example of one of plurality of sub-cores 118. Each of plurality of sub-cores 118 may be implemented in a manner similar to sub-core 206. Sub-core 206 comprises datapath 208 and control unit 210. In some cases, sub-core 206 also includes cache 212.

Datapath 208 may be used to process the data generated by plurality of sub-cores 118. In one illustrative example, datapath 208 may process the data in the redundant residue number system (RRNS) representation.

Datapath 208 may be implemented in different ways. In one illustrative example, datapath 208 may be implemented as set of arithmetic logic units 214. Each arithmetic logic unit (ALU) of set of arithmetic logic units 214 may be capable of performing arithmetic and bitwise logical operations on integer binary numbers. In one illustrative example, set of arithmetic logic units 214 is configured to perform modular arithmetic based on a unique modulus. In this manner, each sub-core of plurality of sub-cores 118 may be considered as performing modular arithmetic based on a unique modulus.

In one illustrative example, each base sub-core of base sub-cores 202 is selected to have a unique modulus. When additional sub-cores 204 includes two additional sub-cores, the first additional sub-core may have a unique modulus that is greater than the various moduli of base sub-cores 202. In this illustrative example, the other additional sub-core may have a modulus that is at least double the modulus of the first additional sub-core. All of the moduli of the various sub-cores may be selected such that the moduli are relatively prime.

Each sub-core of plurality of sub-cores 118 is configured to execute the same sequence of instructions. In particular, when no errors are present, each of plurality of sub-cores 118 executes exactly the same instruction on every clock cycle.

For example, each processor core in set of processor cores 112 may execute a same sequence of primary instructions in a synchronized manner. However, each of these primary instructions may reference a set of secondary instructions.

For example, each processor core in set of processor cores 112 may execute a same primary instruction. However, this primary instruction may reference an independent secondary instruction for each processor core. In this manner, each processor core may execute the same primary instruction but an independent secondary instruction that may be the same as or different from the secondary instructions executed by the other processor cores. In particular, each sub-core of a particular processor core, such as processor core 114, executes the same secondary instruction corresponding to that processor core at the same time. In this manner, each processor core of set of processor cores 112 may be capable of processing different types of data based on the secondary instructions, while executing a same single sequence of primary instructions.

The various sub-cores of the various processor cores of set of processor cores 112 may output residues based on the redundant residue number system (RRNS). For example, for each word of data processed, plurality of sub-cores 118 of processor core 114 outputs plurality of residues 216 that represent code word 218. More specifically, each of plurality of residues 216 at least partially represents code word 218. Code word 218 may take the form of data code 220 or memory address code 222.

In one illustrative example, each sub-core of plurality of sub-cores 118 executes one instruction, which is a secondary instruction, at a time per instruction cycle. For example, at the beginning of an instruction cycle, sub-core 206 fetches an instruction from a particular memory address in memory 108. Sub-core 206 then decodes the instruction and executes the instruction.

When the instruction is a memory instruction for accessing a memory address that is to be read from or written to, code word 218 that is output from plurality of sub-cores 118 takes the form of memory address code 222. In this manner, plurality of sub-cores 118 output plurality of residues 216 that represent memory address code 222.

When the instruction is for processing data, code word 218 that is output from plurality of sub-cores 118 is data code 220. In this manner, plurality of sub-cores 118 output plurality of residues 216 that represent data code 220.

Code analysis system 110 is in communication with processor 106 and memory 108. Code analyzer 124 may correspond to processor core 114. Code analyzer 124 receives plurality of residues 216 from plurality of sub-cores 118 of processor core 114 and analyzes plurality of residues 216. Code analyzer 124 may also receive indication 224 from plurality of sub-cores 118. Indication 224 indicates whether plurality of residues 216 represent data code 220 or memory address code 222.

In particular, code analyzer 124 may use plurality of residue-interacting functions 127 to perform error mitigation. For example, code analyzer 124 analyzes plurality of residues 216 to determine whether the residues in plurality of residues 216 are consistent or inconsistent and to control the execution of conditional branches by plurality of sub-cores 118. Plurality of residues 216 may be considered consistent when each residue of plurality of residues 216 can be independently traced back to the same code word. However, if at least one residue of plurality of residues 216 is traced back to a different code word, then plurality of residues 216 are considered inconsistent. Any combination of tables, algorithms, equations, or formulas may be used to trace each of plurality of residues 216 back to a code word.

Regardless of whether plurality of residues 216 represent data code 220 or memory address code 222, when code analyzer 124 determines that plurality of residues 216 are inconsistent, code analyzer 124 sends inconsistent result 226 to plurality of sub-cores 118. Plurality of sub-cores 118 may then attempt to correct the error and resend a new plurality of residues to code analyzer 124.

For example, when plurality of residues 216 are inconsistent and plurality of residues 216 are intended to represent data code 220, plurality of sub-cores 118 may perform the necessary computations to generate a new plurality of residues that represent data code 220. In one illustrative example, plurality of sub-cores 118 may include six sub-cores. When an inconsistency is found in the residue received from one of the six sub-cores, the five correctly operating sub-cores may save their current state to memory 108. These five sub-cores may then recreate their state for the sixth incorrectly operating sub-core using the error correction capabilities of the redundant residue number system. With these six new states now saved, plurality of sub-cores 118 may restart and resume operation from a repaired state.

When plurality of residues 216 are inconsistent and plurality of residues 216 are supposed to represent memory address code 222, plurality of sub-cores 118 may perform the necessary steps to generate a new plurality of residues that represent memory address code 222. This sequence of residue consistency checking and error correction may be performed a repeated number of times until plurality of residues 216 are identified as consistent.

When code analyzer 124 makes a determination that plurality of residues 216 are consistent and plurality of residues 216 represent memory address code 222, code analyzer 124 then accesses the memory address represented by memory address code 222. In particular, code analyzer 124 generates a proper memory address based on plurality of residues 216 for use in accessing memory 108. In one illustrative example, this memory address is generated using high-power transistors that are not subject to error. In some cases, the memory address may be in the binary encoding of typically used memories rather than in a residue number system format. The data accessed from this memory address in memory 108 is then sent to plurality of sub-cores 118 for processing.

When code analyzer 124 makes a determination that plurality of residues 216 are consistent and plurality of residues 216 represent data code 220, code analyzer 124 generates consistent result 228 and performs condition test 230. Condition test 230 may be a test for determining whether data code 220 represented by plurality of residues 216 meets condition 232 or not. In one illustrative example, condition 232 may be that data code 220 is non-negative, that data code 220 is negative, or some other type of condition.

The result of condition test 230 may be test result 234. Test result 234 may be either true or false. For example, without limitation, when condition 232 is that data code 220 is negative, test result 234 may be true when data code 220 is negative and false when data code 220 is positive or zero.

Code analyzer 124 sends test result 234 and consistent result 228 to plurality of sub-cores 118. Plurality of sub-cores 118 may use test result 234 to determine the next instruction to be fetched, decoded, and executed. For example, plurality of sub-cores 118 may all conditionally branch, or jump, to a new instruction based on test result 234 or may proceed to a next instruction in the current sequence of instructions based on test result 234. In some cases, plurality of sub-cores 118 may ignore the test result when executing non-conditional instructions.

In this manner, code analyzer 124 may be used to perform error mitigation for processor core 114. In particular, code analyzer 124 may perform detection of errors in the data processed by plurality of sub-cores 118 and may perform memory address validation for processor core 114. Similarly, each code analyzer of set of code analyzers 122 may be used to mitigate errors in the data processed by the sub-cores that form each corresponding processor core of set of processor cores 112, respectively.

Plurality of residues 216 may be conveyed between processor 106 and memory 108 in a straightforward manner. The redundant residues of the redundant residue number system in processor core 114 of processor 106 protect the data stored in memory 108.

Validating a memory address may be important to protecting the data stored in memory. For example, a write operation to an incorrect memory address in memory 108 may result in important data being overwritten. An error in the memory address for a read operation from that memory address may result in computational errors.

Figure 3:
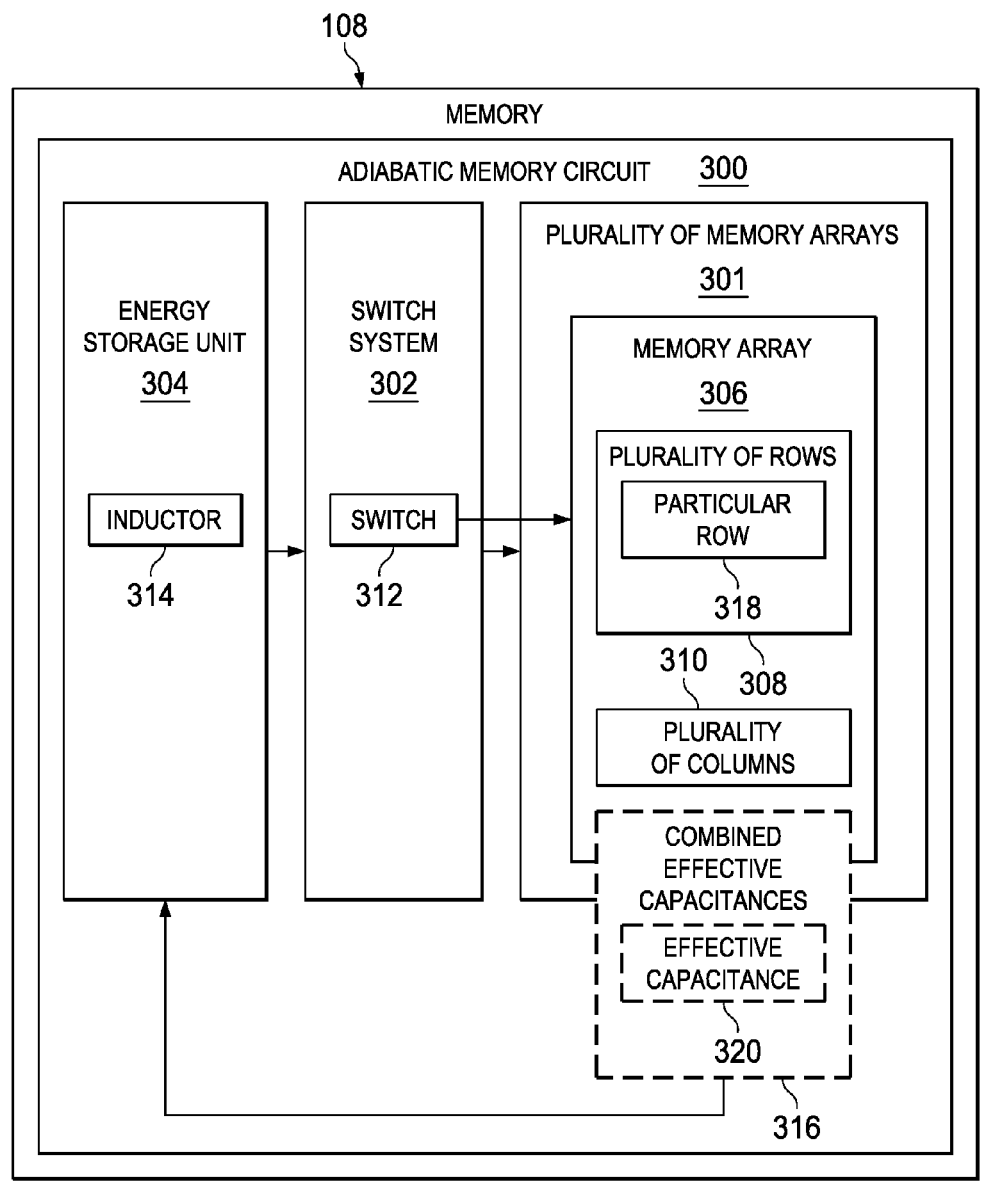
FIG. 3 is an illustration of a block diagram of a memory in accordance with an illustrative embodiment.

With reference now to FIG. 3, an illustration of a block diagram of memory 108 from FIG. 1 is depicted in accordance with an illustrative embodiment. In one illustrative example, memory 108 takes the form of adiabatic memory circuit 300. Adiabatic memory circuit 300 includes plurality of memory arrays 301, switch system 302, and energy storage unit 304.

Memory array 306 may be an example of one of plurality of memory arrays 301. Memory array 306 may also be referred to as a memory bank. As depicted, memory array 306 may be defined as comprising plurality of rows 308 and plurality of columns 310.

Switch system 302 may include any number of switches. In one illustrative example, switch system 302 includes a different switch for each of plurality of memory arrays 301. A switch corresponding to a particular memory array may electrically connect to only one row of that corresponding memory array per cycle.

As one illustrative example, switch system 302 may include switch 312 that corresponds to memory array 306. Switch 312 electrically connects to one particular row of plurality of rows 308 of memory array 306 per cycle. Switch 312 may be bi-directional in that switch 312 allows a bi-directional flow of energy through switch 312.

Energy storage unit 304 may be electrically connected to plurality of memory arrays 301 through switch system 302. For example, energy storage unit 304 may be electrically connected to switch system 302.

In one illustrative example, energy storage unit 304 may be implemented as inductor 314. Inductor 314 may be electrically connected to combined effective capacitances 316 of plurality of memory arrays 301 through switch system 302.

As one illustrative example, at a given point in time, switch 312 may be connected to particular row 318 of memory array 306. Inductor 314 is electrically connected to switch 312 such that inductor 314 may be considered electrically connected to effective capacitance 320 between particular row 318 of memory array 306 and ground. Combined effective capacitances 316 may be the sum of the effective capacitances corresponding to the particular row in each of plurality of memory arrays 301 to which switch system 302 connects at a given point in time. In other words, combined effective capacitances 320 may be the sum of an effective capacitance for each memory array of plurality of memory arrays 301.

By connecting to combined effective capacitances 316 in this manner, inductor 314 may reduce heat loss. In particular, the amount of heat lost to the surroundings may be reduced and a higher percentage of energy may be recycled. Inductor 314 may be used to recycle the energy from combined effective capacitances 316 back onto plurality of memory arrays 301 through switch system 302.

This type of energy recycling in memory 108 improves the energy efficiency of computing system 100 in FIG. 1. Further, the error mitigation capabilities provided by using code analysis system 110 as described in FIG. 2 may allow processor 106 to be implemented using lower signal power. Together, the energy recycling associated with memory 108 and the error mitigation associated with code analysis system 110 may improve the overall energy efficiency of computing system 100 in FIG. 1 without sacrificing the reliability of computing system 100.

The illustrations of computing system 100 in FIG. 1, processor 106, memory 108, and code analysis system 110 in FIGS. 1-2, and adiabatic memory circuit 300 in FIG. 3 are not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

Figure 4:
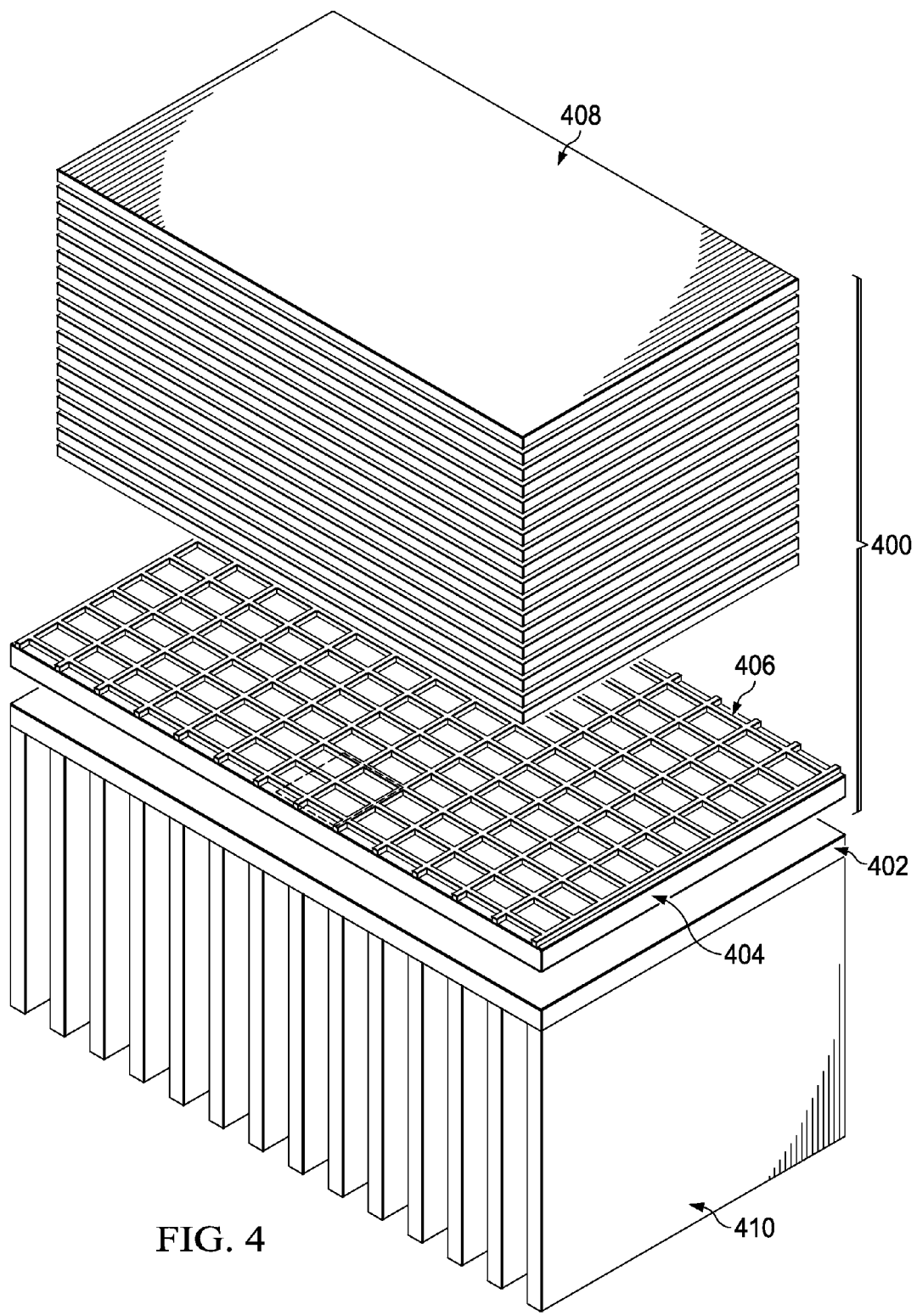
FIG. 4 is an illustration of a processor-in-memory-and-storage architecture in accordance with an illustrative embodiment.

With reference now to FIG. 4, an illustration of a processor-in-memory-and-storage architecture is depicted in accordance with an illustrative embodiment. In this illustrative example, processor-in-memory- and storage architecture 400 may be an example of one implementation for processor-in-memory-and-storage architecture 101 in FIG. 1.

In this illustrative example, processor-in-memory- and storage architecture 400 is implemented on base 402. Base 402 may be an example of one implementation for base 104 in FIG. 1. As depicted, base 402 is positioned over heat sink 410.

Processor-in-memory- and storage architecture 400 includes processor 404, interconnects 406, and memory and storage layers 408. Processor 404 may be an example of one implementation for processor 106 in FIGS. 1 and 2. Interconnects 406 connect processor 404 to memory and storage layers 408. Memory and storage layers 408 may be an example of one implementation for memory 108 in FIG. 1. Processor-in-memory- and storage architecture 400 may be replicated any number of times and stacked in layers over a single base 402 or over multiple modules interconnected by wires or conductive traces on a circuit board, thus forming a more complex computing system.

Figure 5:
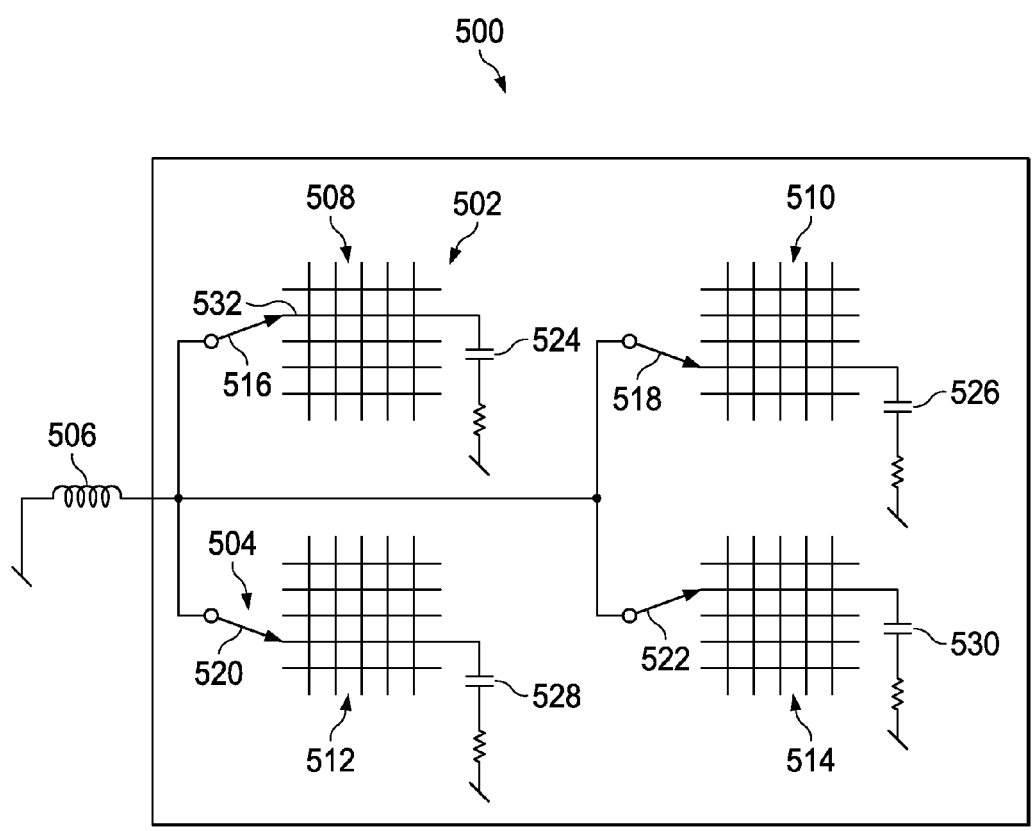
FIG. 5 is an illustration of an adiabatic memory circuit in accordance with an illustrative embodiment.

With reference now to FIG. 5, an illustration of an adiabatic memory circuit is depicted in accordance with an illustrative embodiment. In this illustrative example, adiabatic memory circuit 500 may be an example of one implementation for adiabatic memory circuit 300 in FIG. 3.

As depicted, adiabatic memory circuit 500 includes plurality of memory arrays 502, switch system 504, and energy storage unit 506. Energy storage unit 506 is an example of one implementation for energy storage unit 304 in FIG. 3. In this illustrative example, energy storage unit 506 is implemented as an inductor.

Plurality of memory arrays 502 include memory array 508, memory array 510, memory array 512, and memory array 514. Each of these memory arrays comprises a plurality of rows and a plurality of columns. Each of plurality of memory arrays 502 may be an example of one implementation for memory array 306 in FIG. 3.

In this illustrative example, switch system 504 is implemented using circuit switching, such as with one or more microelectromechanical systems (MEMs) devices, pass transistors, or other suitable types of technologies. As depicted, switch system 504 may include switch 516, switch 518, switch 520, and switch 522. Each of these switches may be an example of one implementation for switch 312 in FIG. 3. Switch 516, switch 518, switch 520, and switch 522 correspond to memory array 508, memory array 510, memory array 512, and memory array 514, respectively.

Each switch in switch system 504 electrically connects to one row of the corresponding memory array at a time and is capable of allowing energy to flow in both directions between energy storage unit 506 and the corresponding memory array with reduced heat loss. For example, switch 516 electrically connects to one row of memory array 508 at a time and allows a bi-directional flow of energy through switch 516 between energy storage unit 506 and memory array 508 with reduced heat loss.

Energy storage unit 506 electrically connects in series to the sum of effective capacitance 524, effective capacitance 526, effective capacitance 528, and effective capacitance 530. This sum may be referred to as the combined effective capacitances over plurality of memory arrays 502. As depicted, energy storage unit 506 electrically connects in series to effective capacitance 524 between particular row 532 to which switch 516 is connected and ground. Energy storage unit 506 electrically connects in series to the effective capacitance for each memory array of plurality of memory arrays.

Connecting energy storage unit 506 to plurality of memory arrays 502 through switch system 504 in the manner described above increases the amount of energy that is recycled back onto plurality of memory arrays 502. Increasing the recycled energy improves the overall energy efficiency of the computing system within which adiabatic memory circuit 500 is used.

Figure 6:
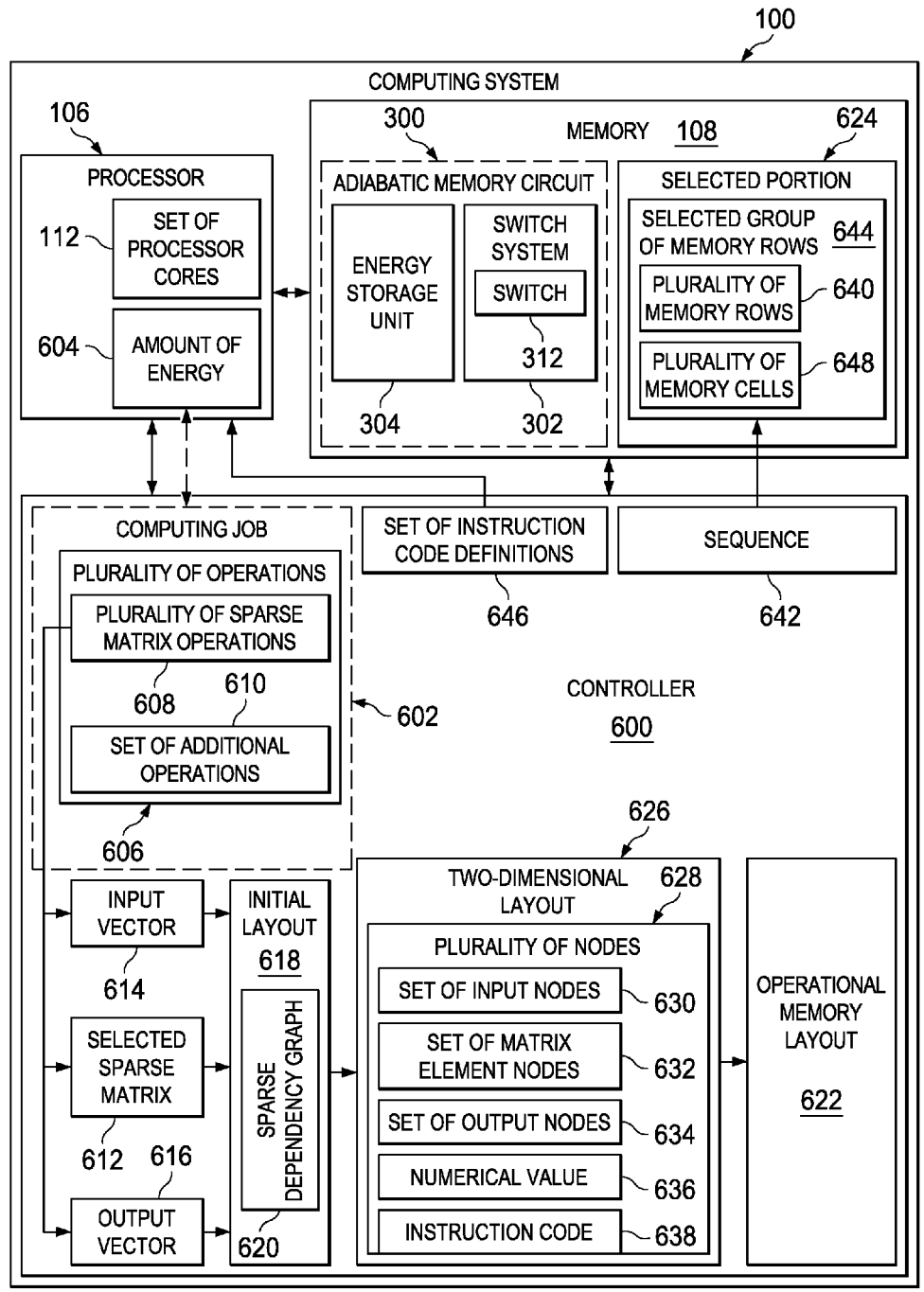
FIG. 6 is an illustration of a controller in the form of a block diagram in accordance with an illustrative embodiment.

With reference now to FIG. 6, an illustration of a controller is depicted in the form of a block diagram in accordance with an illustrative embodiment. In this illustrative example, controller 600 may be implemented using hardware, firmware, software, or a combination thereof.

For example, controller 600 may be implemented within computing system 100 from FIG. 1. In some cases, controller 600 may be implemented using a microprocessor or some other type of processor unit that is in communication with processor 106 and memory 108 of computing system 100 from FIG. 1. In other illustrative examples, controller 600 may be implemented as part of processor 106. For example, controller 600 may be implemented using one or more processor cores that make up processor 106 from FIG. 1.

Controller 600 is used to optimize the portion of a memory that is used to store computing job 602. As one illustrative example, by optimizing the portion of memory 108 from FIG. 1 that is used to store computing job 602, the amount of energy 604 consumed by processor 106 from FIG. 1 during the accessing of memory 108 to perform computing job 602 may be reduced. Computing job 602 may be some type of special-purpose or general-purpose computing job.

As depicted, controller 600 identifies plurality of operations 606 that represent computing job 602. In one illustrative example, plurality of operations 606 includes plurality of sparse matrix operations 608 that are generated using sparse matrix theory. In some cases, plurality of operations 606 may also include set of additional operations 610. In this manner, controller 600 may express computing job 602 using plurality of sparse matrix operations 608 and set of additional operations 610.

Plurality of sparse matrix operations 608 may include, for example, without limitation, sparse vector-matrix multiplication operations that are all performed using selected sparse matrix 612. Selected sparse matrix 612 may also be referred to as a fundamental sparse matrix.

Selected sparse matrix 612 has a defined sparsity pattern. This sparsity pattern is the particular locations within selected sparse matrix 612 having numerical values that are zero and numerical values that are nonzero. Selected sparse matrix 612 also includes specific values for the nonzero numerical values. Plurality of sparse matrix operations 608 may include a vector-matrix multiply operation, which is an operation that uses but does not change either the sparsity pattern or the numerical values of selected sparse matrix 612.

However, other types of sparse matrix operations, such as a learning operation in a neural network, may change one or more numerical values of selected sparse matrix 612 but leave the sparsity pattern of selected sparse matrix 612 unchanged. An operation that changes the sparsity pattern of a sparse matrix may be handled as an additional operation, such as one of set of additional operations 610.

In one illustrative example, the output values produced for output vector 616 for a current sparse matrix operation may be used as the input values for input vector 614 for a next sparse matrix operation. In other illustrative examples, set of additional operations 610 may include an operation that modifies the output values produced for output vector 616 for a current sparse matrix operation to form modified output values. These modified output values may then be used as the input values for input vector 614 for a next sparse matrix operation.

Controller 600 generates initial layout 618 that includes a representation of selected sparse matrix 612. In some illustrative examples, initial layout 618 may also include a representation of input vector 614, output vector 616, or both.

In one illustrative example, initial layout 618 takes the form of, without limitation, sparse dependency graph 620. In some illustrative examples, sparse dependency graph 620 is a sparse, directed acyclic graph (DAG) of arithmetic operations. In one illustrative example, initial layout 618 lays out the data dependencies and data movements associated with performing a multiplication of input vector 614 by selected sparse matrix 612 to yield output vector 616.

Controller 600 transforms initial layout 618 into operational memory layout 622. In particular, controller 600 converts initial layout 618 into operational memory layout 622 that reduces a size of selected portion 624 of memory 108 that needs to be accessed by processor 106 to perform computing job 602. This transformation may be performed using one or more different types of graph layout algorithms or combination thereof. Operational memory layout 622 is a compressed representation of initial layout 618 that represents all data operations and data movement in a top-down manner. In particular, operational memory layout 622 is smaller in size than initial layout 618.

In one illustrative example, controller 600 forms operational memory layout 622 using two-dimensional layout 626 of nodes. For example, controller 600 may transform each sparse matrix operation of plurality of sparse matrix operations 608 into plurality of nodes 628. Plurality of nodes 628 may include set of input nodes 630, set of matrix element nodes 632, and set of output nodes 634. Further, each of plurality of nodes 628 includes numerical value 636, instruction code 638, or both.

Each of set of input nodes 630 may represent an input value of input vector 614. This input value is a numerical value. Each of set of output nodes 634 may represent an output value of output vector 616. This output value is a numerical value.

Further, each matrix element node of set of matrix element nodes 632 may represent a matrix element of selected sparse matrix 612. This matrix element includes a numerical value. Additionally, each matrix element node of set of matrix element nodes 632 may correspond to a set of arithmetic operations, which may include at least one of an addition operation or a multiplication operation. This set of arithmetic operations may be defined by an instruction code. In some illustrative examples, an instruction code may also specify data movement operations that do not change numerical values. For example, data movement operations include, but are not limited to, delaying a numerical value by a time step, sending a numerical value from a particular processor core to another processor core to the left or right of the particular processor core. In this manner, each matrix element node of set of matrix element nodes 632 includes a numerical value and an instruction code.

Controller 600 arranges set of input nodes 630, set of matrix element nodes 632, and set of output nodes 634 that form plurality of nodes 628 to form two-dimensional layout 626. Two-dimensional layout 626 is used to form operational memory layout 622. Depending on the implementation, operational memory layout 622 may include all of two-dimensional layout 626, only the portion of two-dimensional layout 626 that includes set of matrix element nodes 632, or some other portion of two-dimensional layout 626.

In one illustrative example, controller 600 stores set of matrix element nodes 632 in plurality of memory cells 636 within selected portion 624 of memory 108 based on operational memory layout 622. In this manner, a numerical value and an instruction code are stored in each of plurality of memory cells 636. Operational memory layout 622 may span plurality of memory rows 640 within memory 108. In this illustrative example, controller 600 stores set of input nodes 630, set of output nodes 634, or both into registers associated with processor 106.

Controller 600 determines sequence 642 by which memory rows of memory 108 need to be accessed to perform computing job 602. Sequence 642 may include, for example, without limitation, a plurality of cycles of accessing plurality of memory rows 640. In some cases, a particular cycle may include accessing one or more additional memory rows of memory 108. In this manner, the memory rows accessed during each cycle of memory access may be the same or different.

As one illustrative example, controller 600 determines that processor 106 is to access selected group of memory rows 644 in memory 108. Selected group of memory rows 644 includes at least plurality of memory rows 640. Processor 106 accesses selected group of memory rows 644 in memory 108 according to sequence 642 determined by controller 600.

For example, during one cycle, processor 106 may access each memory row in selected group of memory rows 644 of memory 108 according to sequence 642. Processor 106 reads each memory row and implements, or executes, a set of tasks corresponding to each memory row. At the end of the cycle, processor 106 produces output values for output vector 616. These output values may then be used as input values for input vector 614 at the beginning of the next cycle, as determined by sequence 642. This process may be repeated until sequence 642 has been completed.

When processor 106 reads a memory row that is one of plurality of memory rows 640 corresponding to operational memory layout 622, each memory cell in a particular memory row will be read by the corresponding processor core of processor 106. Each processor core may use set of instruction code definitions 646 that have been loaded into that processor core to decode the instruction code in a memory cell. Each instruction code definition may define one or more instructions for a corresponding instruction code.

In this manner, when a processor core accesses a particular memory cell and retrieves a numerical value and an instruction code from that memory cell, the processor core uses set of instruction code definitions 646 to identify a set of instructions represented by the instruction code. The processor core then executes the set of instructions using the numerical value. If executing the set of instructions modifies a numerical value for selected sparse matrix 612, the numerical value may then be written back into memory 108.

When memory 108 includes adiabatic memory circuit 300 from FIG. 3, controller 600 controls switch system 302. As one illustrative example, input vector 614 may be loaded into set of processor cores 112 that form processor 106 such that one input value is loaded into each processor core of set of processor cores 112.

One cycle of processing may correspond to the processing of input vector 614 using selected sparse matrix 612 to form a final output vector 616. In one illustrative example, a cycle of processing corresponds to the performing of one sparse matrix operation.

For a particular cycle of processing, controller 600 identifies selected group of memory rows 644. Controller 600 then controls switch system 302 of adiabatic memory circuit 300 such that switch system 302 electrically connects to each memory row of selected group of memory rows 644, one at a time.

When switch system 302 connects to a particular memory row, energy is moved from energy storage unit 304 to the memory row. Set of processor cores 112 access the memory row using the energy transferred to the memory row from the energy storage unit 304 to charge the effective capacitance of that memory row.

Each processor core of set of processor cores 112 reads a corresponding memory cell of the memory row and retrieves a numerical value, an instruction code, or both. If an instruction code and a numerical value are retrieved, a processor core executes a set of instructions represented by the instruction code based on the numeric value. The resulting value of this processing may then be moved into a register associated with the processor core or another processor core If only a numerical value is retrieved, the processor core may shift the numerical value into an input register associated with the processor core or another processor core.

The energy is then moved from the current memory row back through the switch and back into energy storage unit 304. In other words, the energy is recycled.

The use of operational memory layout 622 enables the energy consumed by processor 106 due to the accessing of memory 108 to be reduced. Further, using operational memory layout 622 in combination with adiabatic memory circuit 300 improves the energy efficiency of computing system 100.

The illustration of controller in FIG. 6 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

Figure 7:
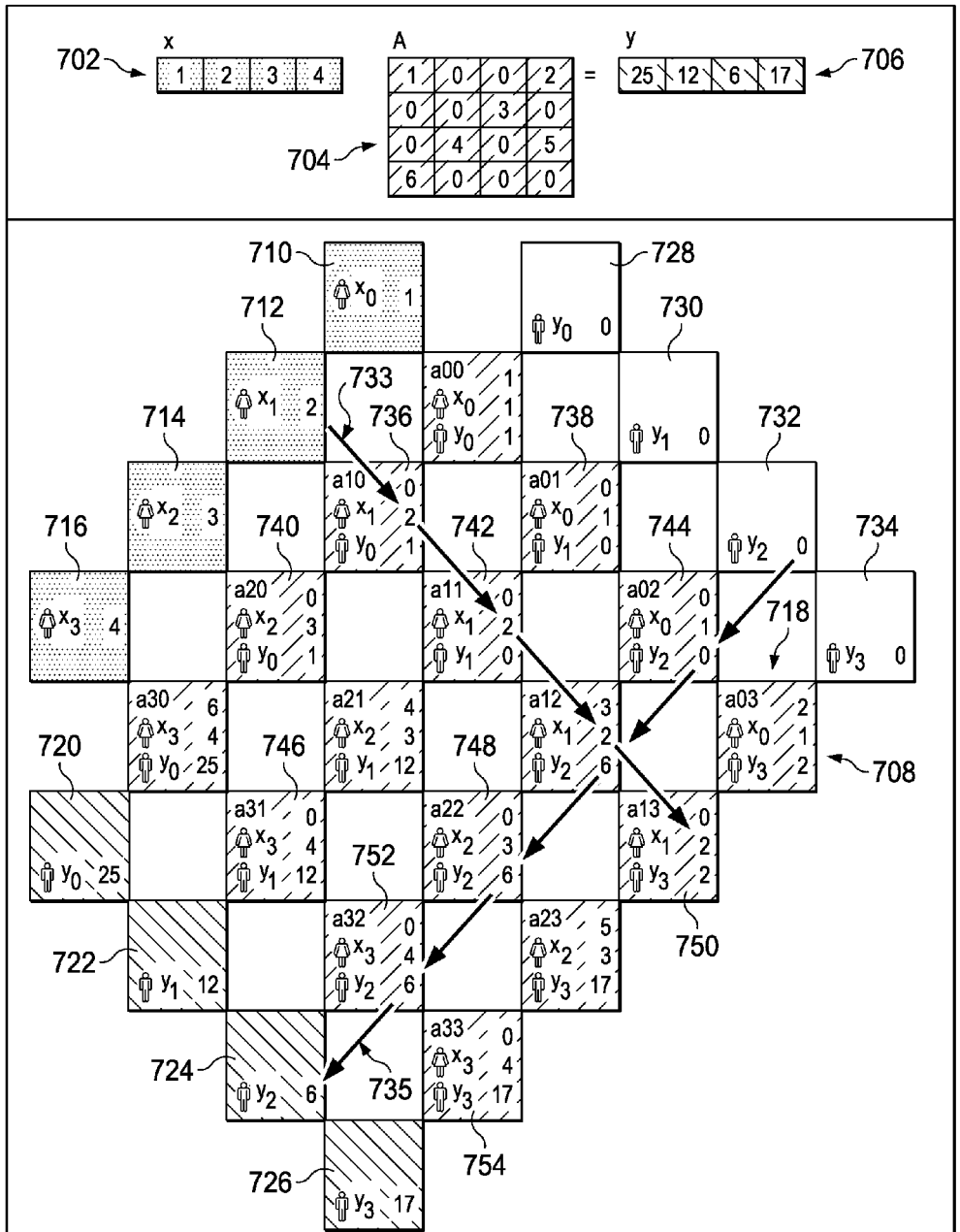
FIG. 7 is an illustration of a dependency graph in accordance with an illustrative embodiment.

With reference now to FIG. 7, an illustration of a dependency graph is depicted in accordance with an illustrative embodiment. In this illustrative example, dependency graph 700 has been created based on a sparse matrix operation that involves input vector 702, sparse matrix 704, and output vector 706.

Input vector 702, sparse matrix 704, and output vector 706 may be examples of implementations for input vector 614, selected sparse matrix 612, and output vector 616, respectively, in FIG. 6. In this illustrative example, dependency graph 700 represents a vector-matrix multiplication in which input vector 702 is multiplied by sparse matrix 704 to produce output vector 706.

In this illustrative example, the individual vector elements of input vector 702 and output vector 706 and the matrix elements of sparse matrix 704 are rearranged to form dependency graph 700 having plurality of rows 708. Input vector 702 is represented by input elements 710, 712, 714, and 716 in dependency graph 700. The matrix elements of sparse matrix 704 are represented by plurality of matrix elements 718. Output vector 706 is represented by output elements 720, 722, 724, and 726. Elements 728, 730, 732, and 734 represent the initialization of the output values for output vector 706. In this manner, elements 728, 730, 732, and 734 may be referred to as initialized output values that form an initialized output vector.

As depicted, each of input elements 710, 712, 714, and 716 is associated with a numerical value. Similarly, each of output elements 720, 722, 724, and 726 is associated with a numerical value. In this illustrative example, each matrix element of plurality of matrix elements 718 is associated with a numerical value and represents a multiplication operation, an addition operation, or a combination of these two operations.

In this illustrative example, input values, which are denoted by "x," flow down and to the right. For example, the input value in input element 712 flows down and to the right, as indicated by arrows 733. Output values, which are denoted by "y," are initialized to zero, as indicated by elements 728, 730, 732, and 734. Output values flow down and to the left but are updated along the way. For example, an initialized output value, represented by element 732 is initialized to zero and then flows down and to the right, as indicated by arrows 735. Each time an input value, "x," and an output value, "y," meet at a matrix element containing a numerical value "$a_{ij}$," the output value is updated to be $y+a_{ij}*x$.

Dependency graph 700 may be modified to form a sparse dependency graph. For example, each matrix element of plurality of matrix elements 718 that has a numerical value of zero may be removed from dependency graph 700. In particular, matrix elements 736, 738, 740, 742, 744, 746, 748, 750, 752, and 754 may be removed from dependency graph 700 to form a sparse dependency graph. The remaining matrix elements, input elements, and output elements may then be used to form an operational memory layout, such as operational memory layout 622 in FIG. 6.

The matrix elements having numerical values of zero may be removed because the arithmetic operation involved is to accumulate the products of matrix elements and vector elements. When the numerical value of a matrix element is zero, multiplying the matrix element by any value results in zero. The addition of zero to any accumulating sum has no effect on the accumulating sum. Thus, the matrix elements having numerical values of zero may be removed due to the nature of the vector-matrix multiplication problem without affecting the final result.

In other illustrative examples, the sparse dependency graph may be directly created using various graph analytics and graph layout algorithms without having to first create dependency graph 700. The inputs to these types of algorithms may be graphs that can be represented as sparse matrices. The algorithms may then be used to find parameters such as, for example, without limitation, graph diameter, minimum flow, maximum flow, some other type of parameter, or some combination thereof.

Figure 8:
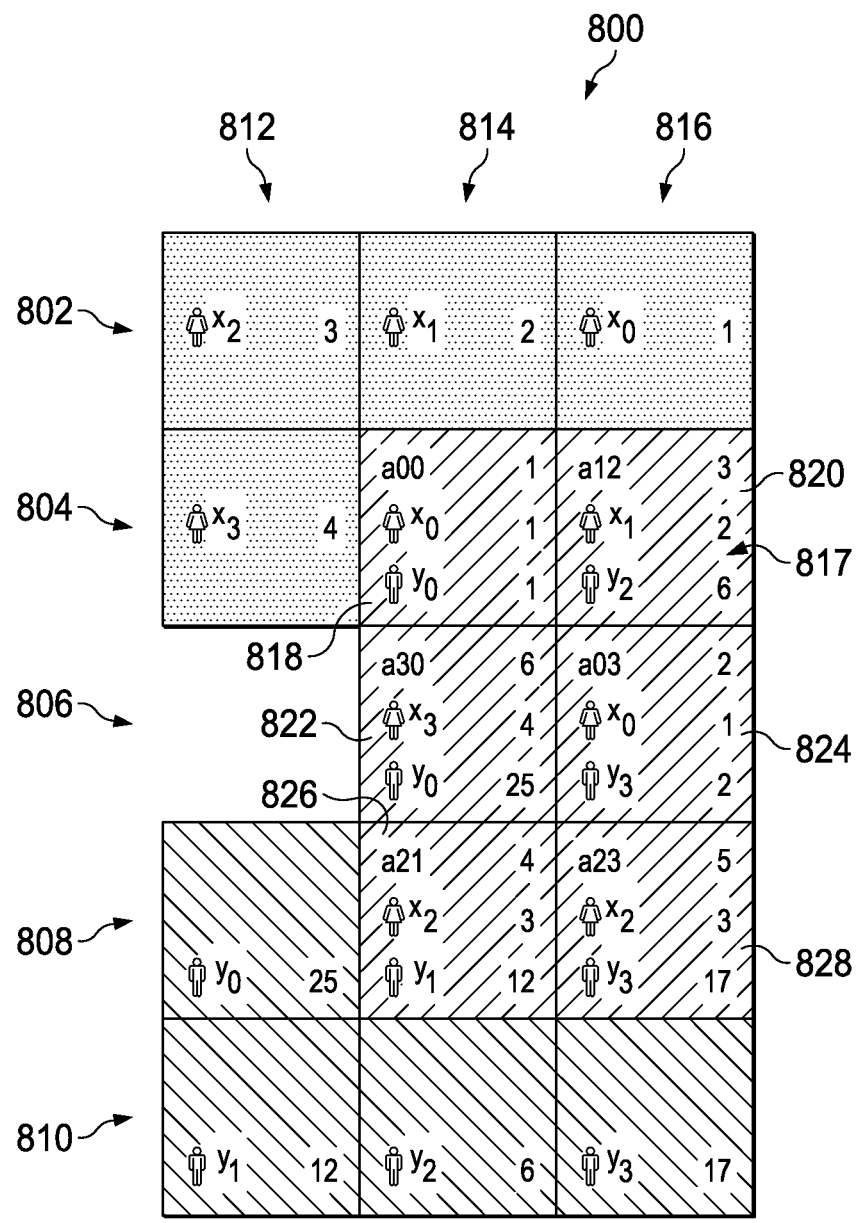
FIG. 8 is an illustration a two-dimensional layout in accordance with an illustrative embodiment.

With reference now to FIG. 8, an illustration of a two-dimensional layout is depicted in accordance with an illustrative embodiment. In this illustrative example, two-dimensional layout 800 may be an example of one implementation for two-dimensional layout 626 in FIG. 6. Two-dimensional layout 626 is generated based on dependency graph 700. In particular, the sparse dependency graph created by removing matrix elements 736, 738, 740, 742, 744, 746, 748, 750, 752, and 754 from dependency graph 700 in FIG. 7 may be transformed into two-dimensional layout 800.

In this illustrative example, two-dimensional layout 800 includes rows 802, 804, 806, 808, and 810 and columns 812, 814, and 816. Each of columns 812, 814, and 816 may correspond to a corresponding processor core of a set of processor cores. The three columns may correspond to three processor cores in this illustrative example.

The set of processor cores may process each of the rows of two-dimensional layout 800, one at a time and at a same time. As depicted in this example, a particular element of a row may contain information that will be stored in memory or loaded into a register.

As depicted, two-dimensional layout 800 may be used to create operational memory layout 817. Operational memory layout 817 includes matrix elements 818, 820, 822, 824, 826, and 828. Operational memory layout 817 defines the way in which information is stored in memory and thereby, the way in which the set of processor cores will perform computations.

For example, operational memory layout 817 is fully limited to column 814 and column 816. Thus, the instructions that correspond to the matrix elements of operational memory layout 817 will only be executed by the processor cores corresponding to these columns.

In other illustrative examples, the entirety of two-dimensional layout 800 may be used as operational memory layout 817. In this manner, input elements and output elements will be stored in memory and may need to be written over during processing.

Figure 9:
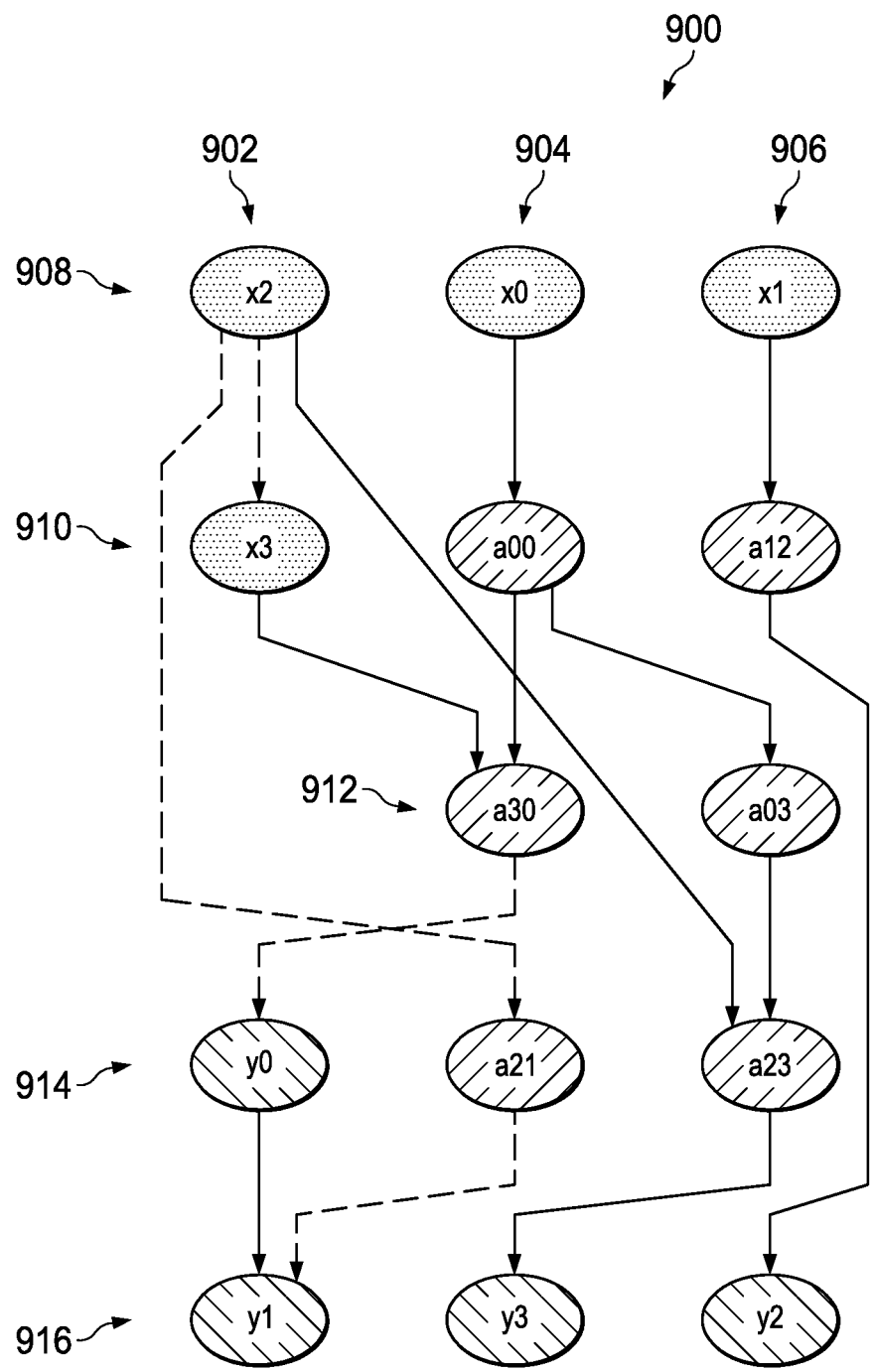
FIG. 9 is an illustration of a graph in accordance with an illustrative embodiment.

With reference now to FIG. 9, an illustration of a graph in another format is depicted in accordance with an illustrative embodiment. In this illustrative example, graph 900 directly corresponds to two-dimensional layout 800 in FIG. 8.

As depicted, graph 900 includes columns 902, 904, and 906, which correspond to columns 812, 814, and 816, respectively in FIG. 8. Graph 900 includes rows 908, 910, 912, 914, and 916, which correspond to rows 802, 804, 806, 808, and 810, respectively, in FIG. 8. In this illustrative example, the various elements that make up two-dimensional layout 800 in FIG. 8 are represented as nodes in graph 900. Arrows 918, which may also be referred to as arcs, represent the data movements and sparsity pattern of sparse matrix 704 in FIG. 7, laid out in two-dimensions to form graph 900.

Figures 10, 11:
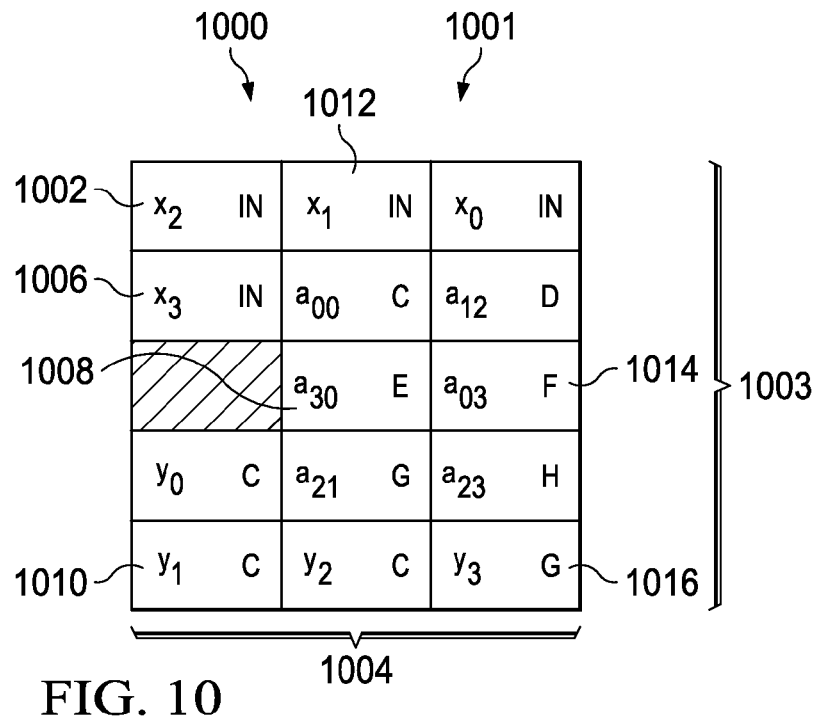
FIG. 10 is an illustration of a portion of a memory array in accordance with an illustrative embodiment.
FIG. 11 is an illustration of a table defining various instruction codes in accordance with an illustrative embodiment.

With reference now to FIG. 10, an illustration of a portion of a memory array is depicted in accordance with an illustrative embodiment. In this illustrative example, portion 1000 of memory array 1001 includes plurality of memory cells 1002. As depicted, portion 1000 of memory array 1001 includes plurality of rows 1003 and plurality of columns 1004.

Each memory cell in plurality of memory cells 1002 stores a numerical value and an instruction code in this illustrative example. The numerical values and instruction codes stored in plurality of memory cells 1002 may be based on graph 900 in FIG. 9.

As depicted, plurality of memory cells 1002 include input cells 1006, matrix element cells 1008, and output cells 1010. Input cell 1012 is an example of one of input cells 1006. Matrix element cell 1014 is an example of one of matrix element cells 1008. Output cell 1016 is an example of one of output cells 1010.

As depicted, input cell 1012 includes the numerical value "$x_1$" and the instruction code "IN." Matrix element cell 1014 includes the numerical value "$a_{30}$" and the instruction code "E." Output cell 1016 includes the numerical value "$y_3$" and the instruction code "G."

Each column of plurality of columns 1004 is processed by a different processor core. Further, these processor cores process each row of plurality of rows 1003 during a same time step. At each time step, a processor core will either store the resulting value of a computation that has been performed for use at a next time step or transfer the resulting value to a neighboring processor core to the left or right of the processor core.

In this illustrative example, input values of an input vector for a vector-matrix multiply operation may be written into memory array 1001 in input cells 1006 and output values of the resulting output vector may be written into memory array 1001 in output cells 1010. However, in other illustrative examples, input cells 1006, output cells 1010, or both may not be needed. For example, the output values of the output vector may be more efficiently stored in registers associated with the processor core if those output values are immediately used as the input values of the next input vector processed.

Turning now to FIG. 11, an illustration of a table defining each of the various instruction codes shown in FIG. 10 is depicted in accordance with an illustrative embodiment. In this illustrative example, table 1100 contains plurality of columns 1102. Plurality of columns 1102 includes instruction code column 1104, Y output column 1106, left output column 1108, right output column 1110, and wait zone output column 1112.

In table 1100,

"init" is an input value of an input vector;

"a" is a numerical value of a corresponding matrix element stored in memory;

"Yin" is a core input, which is an initialized output value at a first time step or a value stored in the processor core from the output, Yout, of that processor core in the previous time step;

"Yout" is a core output, which is the output from a processor core that will be used as an input to the same processor core at the next time step;

"Rin" is a right input, which is the input to a processor core that is an initialized output value at a first time step or the output from a previous time step from another processor core to the immediate right;

"Rout" is a right output, which is the output from a processor core that will be used as an input to another processor core that is to the immediate right at a next time step;

"Lin" is a left input, which is the input to a processor core that is an initialized output value at a first time step or the output from a previous time step from another processor core to the immediate left;

"Lout" is a left output, which is the output from a processor core that will be used as an input to another processor core that is to the immediate left at a next time step;

"WZin" is a wait zone input, which is an initialized value at a first time step or a value from a previous time step retrieved from a temporary storage location, "wait zone," of a processor core; and "WZout" is a wait zone output to the temporary storage location, "wait zone," of a processor core that will be used by the same processor core at a next time step.

Instruction code column 1104 includes the various instruction codes depicted in FIG. 10. Y output column 1106 defines the core outputs to be output from a processor core based on a corresponding instruction code. In particular, the core output may be the result of a computation to be performed by the processor core based on the corresponding instruction code. The processor core then uses the result of this computation itself as an input for a computation to be performed at a next time step.

Left output column 1108 defines the left outputs for corresponding instruction codes. Right output column 1110 defines the right outputs for corresponding instruction codes. Wait zone output column 1112 defines the wait zone outputs for corresponding instruction codes.

The instruction codes defined in table 1100 are used to perform a particular type of operation, which is a sparse matrix operation in this illustrative example. However, a computing job may comprise multiple sparse matrix operations and other types of operations. Depending on the implementation, a different set of instruction code definitions may be used for each of the different types of operations.

In one illustrative example, a computer-implemented, artificial neural network may include a learning phase and an image recognition phase. The image recognition phase may use sparse matrix-vector multiply operations, while the learning phase may use an operation that alters the sparse matrix values, because the sparse matrix values represent learned information. In this particular example, the instruction codes defined in table 1100 would be used to perform image recognition. However, a different set of instruction codes would be used for learning. However, the two sets of instruction codes would use the same operational memory layout so that the operational memory layout would not need to be reloaded each time.

Figure 12:
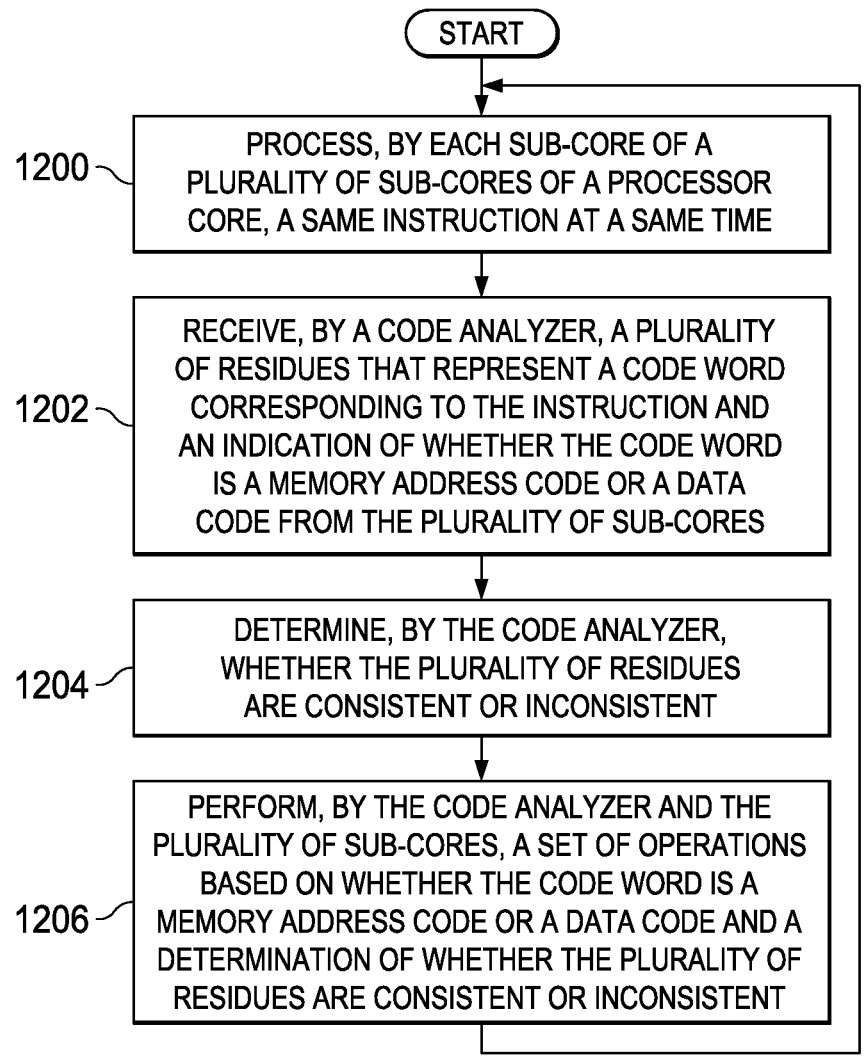
FIG. 12 is an illustration of a process for performing reliable general-purpose computing in the form of a flowchart in accordance with an illustrative embodiment.

With reference now to FIG. 12, an illustration of a process for performing reliable general-purpose computing is depicted in the form of a flowchart in accordance with an illustrative embodiment. The process illustrated in FIG. 12 may be implemented using computing system 120 from FIG. 1.

The process begins by processing, by each sub-core of a plurality of sub-cores of a processor core, a same instruction at a same time (operation 1200). Next, a plurality of residues that represent a code word corresponding to the instruction and an indication of whether the code word is a memory address code or a data code are received by a code analyzer from the plurality of sub-cores (operation 1202).

A determination is made, by the code analyzer, of whether the plurality of residues are consistent or inconsistent (operation 1204). In operation 1204, the consistency check is performed to ensure that all of the plurality of residues may be traced back to a same code word. If at least one of the plurality of residues cannot be traced back to the same code word as the other residues, then the plurality of residues are considered inconsistent.

The code analyzer and the plurality of sub-cores perform a set of operations based on whether the code word is a memory address code or a data code and a determination of whether the plurality of residues are consistent or inconsistent (operation 1206), with the process then returning to operation 1200. Operation 1200, operation 1202, operation 1204, and operation 1206 may be performed per instruction cycle of the computing system.

Figure 13:
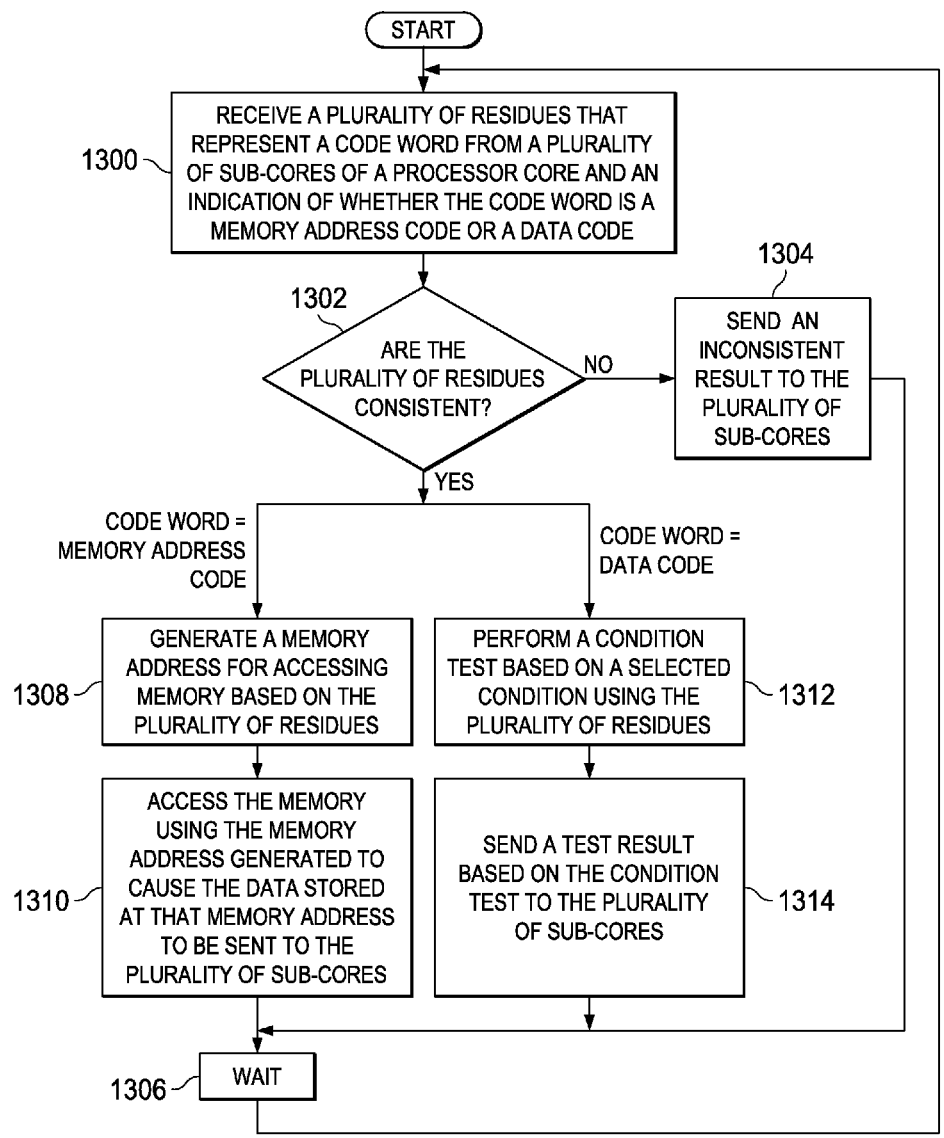
FIG. 13 an illustration of a process for performing error mitigation in the form of a flowchart in accordance with an illustrative embodiment.

With reference now to FIG. 13, an illustration of a process for performing error mitigation is depicted in the form of a flowchart in accordance with an illustrative embodiment. The process illustrated in FIG. 13 may be implemented using a code analyzer, such as code analyzer 144 described in FIGS. 1-2.

The process begins by receiving a plurality of residues that represent a code word from a plurality of sub-cores of a processor core and an indication of whether the code word is a memory address code or a data code (operation 1300). Next, a determination is made as to whether the plurality of residues are consistent (operation 1302).

If the plurality of residues are not consistent, an inconsistent result is sent to the plurality of sub-cores (operation 1304). The process then waits (operation 1306) until a new plurality of residues is received from the plurality of sub-cores as described above in operation 1300. In this illustrative example, in response to receiving the inconsistent result sent from the code analyzer in operation 1304, the plurality of sub-cores may attempt to correct the error and send a new plurality of residues back to the code analyzer.

With reference again to operation 1302, if the plurality of residues are consistent, a first set of operations are performed if the code word represented by the plurality of residues is a memory address code and a second set of operations are performed if the code word represented by the plurality of residues is a data code. For example, if the code word is a memory address code, the code analyzer generates a memory address for accessing memory based on the plurality of residues (operation 1308). The code analyzer then accesses the memory using the memory address generated to cause the data stored at that memory address to be sent to the plurality of sub-cores (operation 1310), with the process then proceeding to operation 1306 described above.

With reference again to operation 1302, if the plurality of residues are consistent and the code word represented by the plurality of residues is a data code, the code analyzer performs a condition test based on a selected condition using the plurality of residues (operation 1312). The code analyzer then sends a test result based on the condition test to the plurality of sub-cores (operation 1314), with the process then proceeding to operation 1306 described above.

In one illustrative example, the condition test performed in operation 1312 may be whether the data code is a negative integer or not. If the data code is a negative integer, then a true test result may be sent to plurality of sub-cores in operation 1314. If the data code is a non-negative integer, then a false test result may be sent to the plurality of sub-cores in operation 1314.

Based on the test result received by the plurality of sub-cores, the plurality of sub-cores may fetch, decode, and execute a next instruction. For example, if a true test result is received, the plurality of sub-cores may branch, or jump, to new instruction out-of-sequence with respect to the current sequence of instructions being processed. If a false test result is received, the plurality of sub-cores may fetch, decode, and execute the next instruction in the current sequence of instructions being processed.

The error mitigation performed in the process described in FIG. 13 may be used to ensure the reliability of the computations performed by the plurality of sub-cores. This process may be a simple and low-energy method for detecting errors introduced by using signals of lower power to define the values of binary digits.

Figure 14:
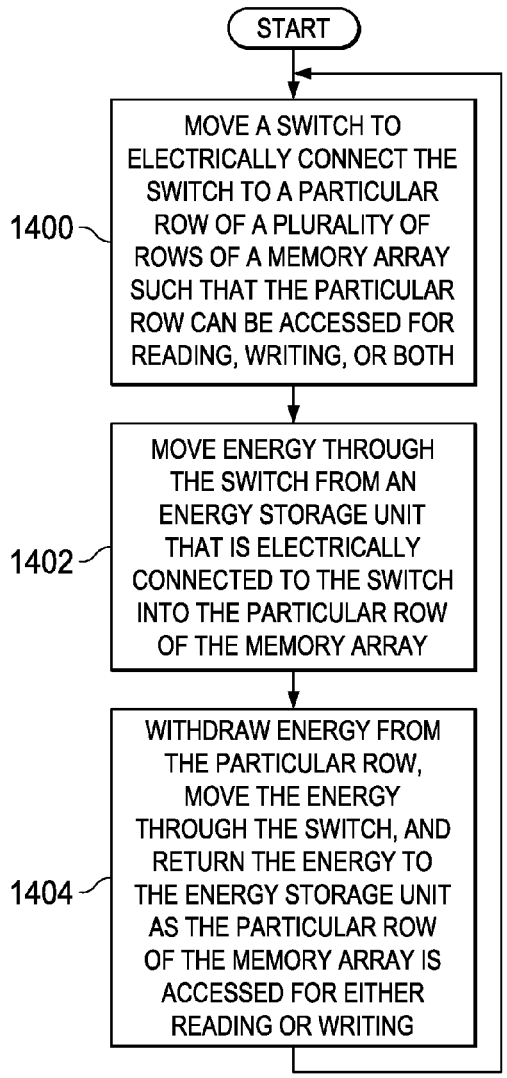
FIG. 14 an illustration of a process for recycling energy in the form of a flowchart in accordance with an illustrative embodiment.

With reference now to FIG. 14, an illustration of a process for recycling energy is depicted in the form of a flowchart in accordance with an illustrative embodiment. The process illustrated in FIG. 12 may be implemented using adiabatic memory circuit 300 in FIG. 3.

The process begins moving a switch to electrically connect the switch to a particular row of a plurality of rows of a memory array such that the particular row can be accessed for reading, writing, or both (operation 1200). In one illustrative example, this memory array may be part of a computing system, such as computing system 120 in FIG. 1. For example, the memory array may belong to a processor-in-memory-and-storage architecture, such as processor-in-memory-and-storage architecture 121 in FIG. 1.

Energy is moved through the switch from an energy storage unit that is electrically connected to the switch into the particular row of the memory array (operation 1202). In one illustrative example, the energy storage takes the form of an inductor. However, in other illustrative examples, the energy storage unit may take the form of some other electromechanical device capable of storing energy.

In some cases, during operation 1402, energy provided from a power supply may also be moved into the particular row of the memory array. However, by moving energy from the energy storage unit into the particular row of the memory array, the amount of energy drawn from the power supply may be reduced.

As the particular row of the memory array is accessed for either reading or writing, energy is withdrawn from the particular row, moved through the switch, and returned to the energy storage unit (operation 1404), with the process then returning to operation 1400 described above. In this manner, the switch allows a bi-directional flow of energy between the energy storage unit and the memory array.

The percentage of the amount of energy sent into the particular row of the memory array from the energy storage unit, power supply, or a combination of the two that is returned to the energy storage unit through the switch may be above a selected threshold. This percentage may be referred to as the percentage of row energy recycled. In one illustrative examples, the percentage of row energy recycled may be greater than about 95 percent. In some illustrative examples, the percentage of row energy recycled may be greater than about 98 percent.

The process described in FIG. 14 may ultimately reduce heat loss during accessing of the memory array. In particular, by enabling recycling of the energy used to access the rows of the memory array, overall heat loss may be reduced. This type of energy recycling, and thereby heat loss reduction, may improve the overall energy efficiency of the computing system to which the memory array belongs.

Figure 15:
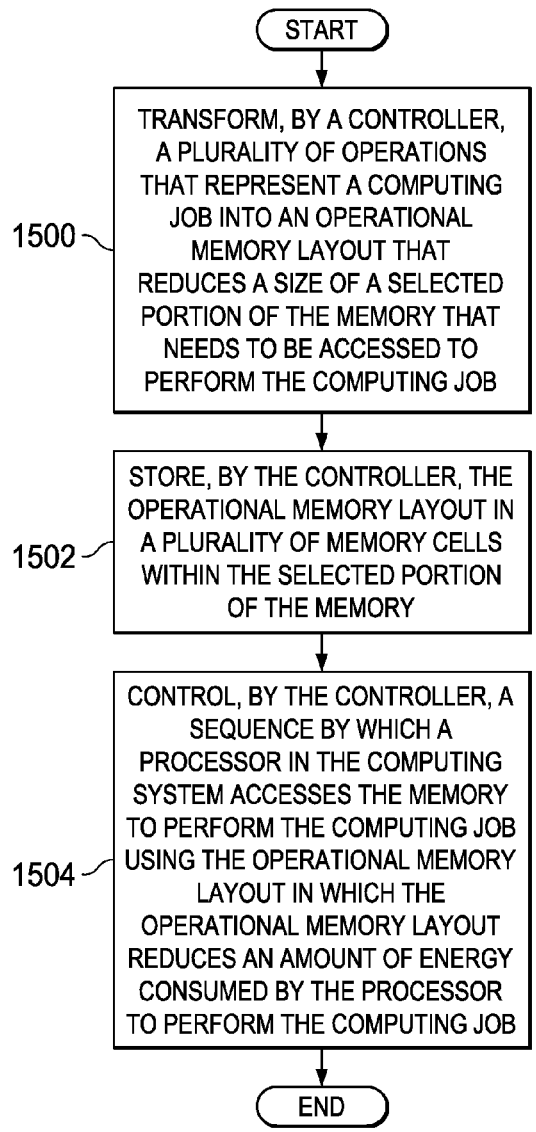
FIG. 15 is an illustration of a process for managing access to a memory in the form of a flowchart in accordance with an illustrative embodiment.

With reference now to FIG. 15, an illustration of a process for managing access to a memory is depicted in the form of a flowchart in accordance with an illustrative embodiment. The process illustrated in FIG. 15 may be implemented using a controller, such as controller 600 in FIG. 6.

The process begins by, transforming, by a controller, a plurality of operations that represent a computing job into an operational memory layout that reduces a size of a selected portion of the memory that needs to be accessed to perform the computing job (operation 1500). Next, the controller stores the operational memory layout in a plurality of memory cells within the selected portion of the memory (operation 1502).

Thereafter, the controls a sequence by which a processor in the computing system accesses the memory to perform the computing job using the operational memory layout in which the operational memory layout reduces an amount of energy consumed by the processor to perform the computing job (operation 1504), with the process terminating thereafter. When the processor accesses the memory according to the sequence, the processor may access a selected group of memory rows in the memory according to the sequence. The operational memory layout spans a plurality of memory rows in the memory that are included in the selected group of memory rows. Further, the processor may repeat this cycle any number of types to perform the computing job.

Figure 16:
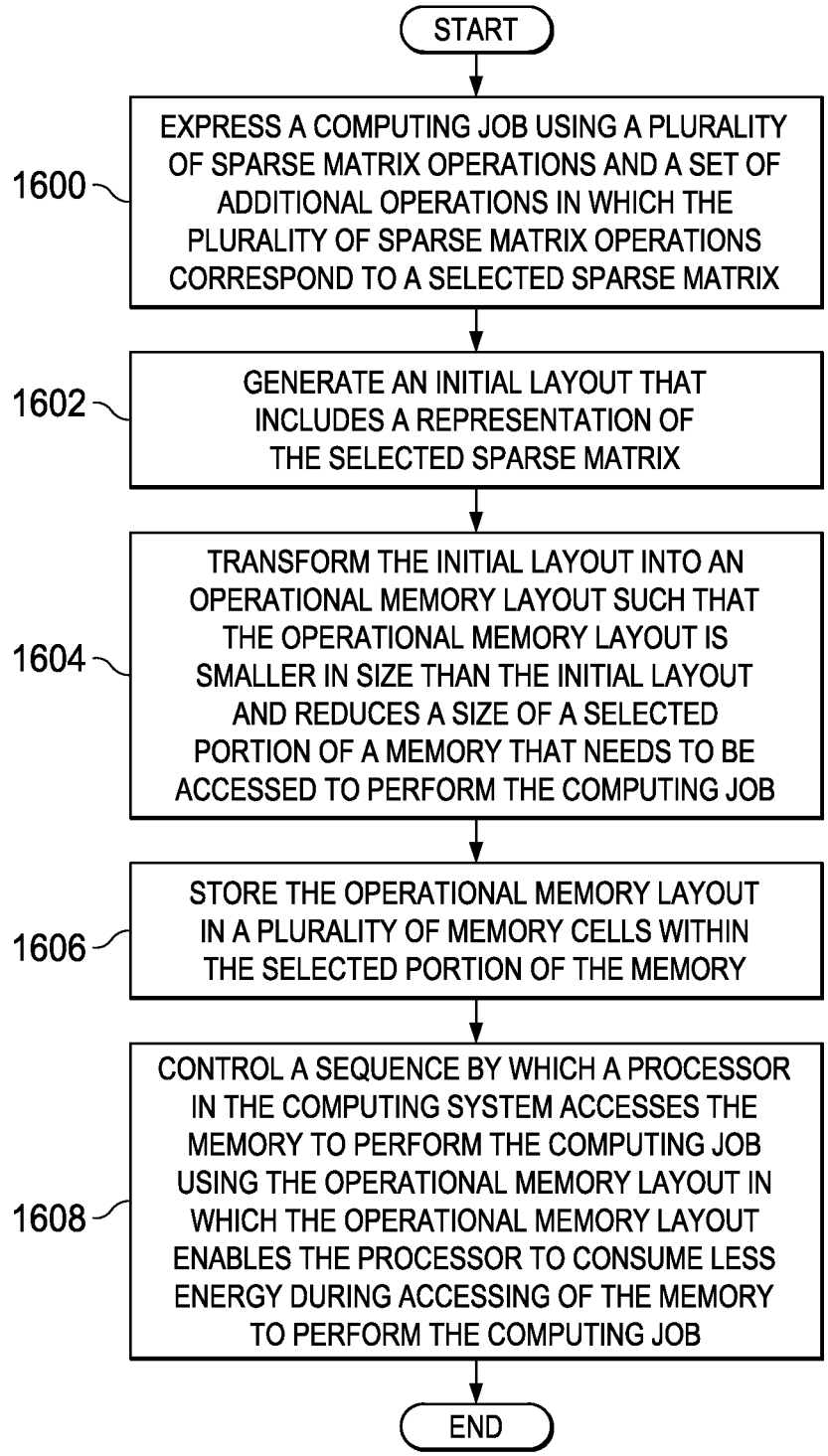
FIG. 16 is an illustration of a process for managing access to a memory in the form of a flowchart in accordance with an illustrative embodiment.

With reference now to FIG. 16, an illustration of a process for managing access to a memory is depicted in the form of a flowchart in accordance with an illustrative embodiment. The process illustrated in FIG. 16 may be implemented using a controller, such as controller 600 in FIG. 6.

The process may begin by expressing a computing job using a plurality of sparse matrix operations and a set of additional operations in which the plurality of sparse matrix operations correspond to a selected sparse matrix (operation 1600). Next, an initial layout is generated that includes a representation of the selected sparse matrix (operation 1602).

The initial layout is transformed into the operational memory layout such that the operational memory layout is smaller in size than the initial layout and reduces a size of a selected portion of a memory that needs to be accessed to perform the computing job (operation 1604). The operational memory layout is stored in a plurality of memory cells within the selected portion of the memory (operation 1606). A sequence by which a processor in the computing system accesses the memory to perform the computing job using the operational memory layout is controlled in which the operational memory layout enables the processor to consume less energy during accessing of the memory to perform the computing job (operation 1608), with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Thus, the illustrative embodiments provide a low-energy computing system that may be used to implement a sequence of computers. Each computer may comprise an adiabatic memory with a high percentage of energy recycling and a processor with low energy signals. Each core of the processor uses an error correction code to detect errors arising due to the low energy signals and other factors. An address connection from the processor to the memory includes validation of the address using a residue interacting function block and conversion of the low energy signals into higher energy signals.

Each future generation of this computing architecture may have adiabatic memories with higher percentages of energy recycling and processors with lower energy signals. In this manner, energy efficiency may be increased by using more sophisticated circuit components and error correction codes without sacrificing performance.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a memory;
   a processor core in communication with the memory, wherein the processor core comprises a plurality of sub-cores in which a numeric range of each of the plurality of sub-cores is less than a total numeric range of the processor core; and
   a code analyzer in communication with the memory and the plurality of sub-cores of the processor core, wherein the code analyzer performs error mitigation using code words received from the plurality of sub-cores.

2. The apparatus of claim 1, wherein the code analyzer performs data error detection using a plurality of residues received from the plurality of sub-cores in which the plurality of residues represent a code word.

3. The apparatus of claim 2, wherein each sub-core of the plurality of sub-cores comprises:
   a datapath; and
   a control unit.

4. The apparatus of claim 3, wherein the datapath comprises:
   a set of arithmetic logic units that outputs a residue based on the code word and modular arithmetic, wherein the set of arithmetic logic units is associated with a unique modulus.

5. The apparatus of claim 3, wherein the sub-core further comprises:
   a cache.

6. The apparatus of claim 1, wherein each sub-core of the plurality of sub-cores executes a same sequence of instructions.

7. The apparatus of claim 6, wherein the code analyzer analyzes a plurality of residues that represent a code word to control execution of conditional branches by the plurality of sub-cores.

8. The apparatus of claim 1, wherein the code analyzer performs memory address validation for the processor core using the code words.

9. The apparatus of claim 1, wherein the memory comprises:
   an adiabatic memory circuit in communication with the plurality of sub-cores of the processor core.

10. The apparatus of claim 9, wherein the adiabatic memory circuit comprises:
    a memory array;
    a switch that electrically connects to one row of the memory array per cycle; and
    an energy storage unit that is electrically connected to the memory array through the switch.

11. The apparatus of claim 10, wherein the energy storage unit recycles energy from the memory array to reduce heat loss.

12. The apparatus of claim 11, wherein the energy storage unit comprises:
    an inductor.

13. The apparatus of claim 1, wherein the numeric range is a number of different numerical values that can be represented by a sub-core and the total numeric range is a number of different numerical values that can be represented by the processor core.

14. A computing system comprising:
    a processor comprised of a set of processor cores, wherein a processor core in the set of processor cores comprises:
       a plurality of sub-cores in which a numeric range of each of the plurality of sub-cores is less than a total numeric range of the processor core;
    a memory in communication with the processor; and
    a code analysis system in communication with the processor and the memory, wherein the code analysis system comprises:
       a set of code analyzers in communication with the set of processor cores, wherein each code analyzer performs data error detection for data processed by a corresponding processor core of the set of processor cores and performs memory address validation for the corresponding processor core.

15. The computing system of claim 14, wherein the memory comprises:
    a plurality of memory arrays, wherein a single processor core of the set of processor cores connects to a particular memory array of the plurality of memory arrays at a time.

16. The computing system of claim 14, wherein the memory comprises:
    an adiabatic memory circuit that includes an energy storage unit.

17. The computing system of claim 14, wherein the numeric range is a number of different numerical values that can be represented by a sub-core and the total numeric range is a number of different numerical values that can be represented by the processor core.

18. A method for performing reliable general-purpose computing, the method comprising:
    processing, by each sub-core of a plurality of sub-cores of a processor core, a same instruction at a same time;
    receiving, by a code analyzer, a plurality of residues that represent a code word corresponding to the same instruction and an indication of whether the code word is a memory address code or a data code from the plurality of sub-cores;
    determining, by the code analyzer, whether the plurality of residues are consistent or inconsistent; and
    performing, by the code analyzer and the plurality of sub-cores, a set of operations based on whether the code word is a memory address code or a data code and a determination of whether the plurality of residues are consistent or inconsistent.

19. The method of claim 18, wherein performing the set of operations comprises:
sending, by the code analyzer, an inconsistent result to the plurality of sub-cores in response to a determination that the plurality of residues are inconsistent regardless of whether the code word is the memory address code or the data code.

20. The method claim 19 further comprising:
correcting, by the plurality of sub-cores, an error in response to receiving the inconsistent result; and
sending, by the plurality of sub-cores, a new plurality of residues to the code analyzer.

21. The method of claim 18, wherein performing the set of operations comprises:
accessing, by the code analyzer, a memory address represented by the code word in response a determination that the memory address code is consistent and the code word being the memory address code.

22. The method of claim 21, wherein performing the set of operations further comprises:
sending data accessed from the memory address in the memory to the plurality of sub-cores for data processing.

23. The method of claim 21, wherein performing the set of operations comprises:
performing, by the code analyzer, a condition test based on a condition for the code word using the plurality of residues in response to a determination that the plurality of residues are consistent and the code word being the data code; and
sending, by the code analyzer, a test result based on the condition test to the plurality of sub-cores.

24. The method of claim 23 further comprising:
fetching, by the plurality of sub-cores, a next instruction based on the test result.

* * * * *